US009793062B2

(12) United States Patent
Itaya et al.

(10) Patent No.: US 9,793,062 B2
(45) Date of Patent: Oct. 17, 2017

(54) ELECTRIC STORAGE DEVICE AND METHOD FOR PRODUCING THE SAME

(71) Applicant: MURATA MANUFACTURING CO., LTD., Nagaokakyo-Shi, Kyoto-fu (JP)

(72) Inventors: Masaharu Itaya, Nagaokakyo (JP); Keiji Horikawa, Nagaokakyo (JP); Manabu Sawada, Nagaokakyo (JP); Hiroyuki Harada, Nagaokakyo (JP); Yuusuke Ueba, Nagaokakyo (JP); Yukio Ehara, Nagaokakyo (JP); Yasuhiko Ueda, Nagaokakyo (JP); Yasutake Fukuda, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 313 days.

(21) Appl. No.: 14/134,449

(22) Filed: Dec. 19, 2013

(65) Prior Publication Data
US 2014/0134487 A1   May 15, 2014

Related U.S. Application Data

(63) Continuation of application No. PCT/JP2012/065983, filed on Jun. 22, 2012.

(30) Foreign Application Priority Data

Jun. 28, 2011 (JP) ................................. 2011-143323

(51) Int. Cl.
*H01M 10/04* (2006.01)
*H01G 11/24* (2013.01)
(Continued)

(52) U.S. Cl.
CPC ............. *H01G 11/24* (2013.01); *H01G 11/12* (2013.01); *H01G 11/20* (2013.01); *H01G 11/28* (2013.01);
(Continued)

(58) Field of Classification Search
CPC .... H01M 2/16; H01M 10/04; H01M 10/0525; H01M 10/0585; H01G 11/12;
(Continued)

(56) References Cited

U.S. PATENT DOCUMENTS 3,988,168 A * 10/1976 Bruneau ................. H01M 6/48
429/129
3,997,365 A * 12/1976 Feldhake ............ H01M 2/0207
429/185
(Continued)

FOREIGN PATENT DOCUMENTS

JP 06-231796 A 8/1994
JP 09-309173 2/1997
(Continued)

OTHER PUBLICATIONS

International Search Report for PCT/JP2012/065983, dated Sep. 11, 2012.

*Primary Examiner* — Muhammad Siddiquee
(74) *Attorney, Agent, or Firm* — Arent Fox LLP

(57) ABSTRACT

An electric storage device includes an electrolyte and an electric storage unit including a positive electrode including a positive-electrode collector electrode and a positive-electrode active-material layer disposed on the positive-electrode collector electrode; a negative electrode including a negative-electrode collector electrode and a negative-electrode active-material layer disposed on the negative-electrode collector electrode and facing the positive-electrode active-material layer; a first insulating layer bonded to the positive electrode and the negative electrode to isolate the positive electrode and the negative electrode from each other; and a region that is sealed with the first insulating layer in plan view and that holds the electrolyte between the positive electrode and the negative electrode, wherein an air (Continued)

permeability P of the first insulating layer satisfies the formula 1250 s/100 cc<P<95000 s/100 cc.

19 Claims, 16 Drawing Sheets

(51) Int. Cl.
| | |
|---|---|
| *H01G 11/84* | (2013.01) |
| *H01M 2/16* | (2006.01) |
| *H01M 10/0525* | (2010.01) |
| *H01G 11/12* | (2013.01) |
| *H01G 11/20* | (2013.01) |
| *H01G 11/28* | (2013.01) |
| *H01G 11/80* | (2013.01) |
| *H01G 11/82* | (2013.01) |
| *H01M 10/0585* | (2010.01) |

(52) U.S. Cl.
CPC ............. *H01G 11/80* (2013.01); *H01G 11/82* (2013.01); *H01M 2/16* (2013.01); *H01M 10/04* (2013.01); *H01M 10/0525* (2013.01); *H01G 11/84* (2013.01); *H01M 10/0585* (2013.01); *Y02E 60/13* (2013.01); *Y10T 29/417* (2015.01); *Y10T 29/49108* (2015.01)

(58) Field of Classification Search
CPC ........ H01G 11/20; H01G 11/28; H01G 11/80; H01G 11/82; H01G 11/24; H01G 11/84; Y10T 29/417; Y10T 29/49108; Y02E 60/13; Y02E 60/122

See application file for complete search history.

(56) References Cited

U.S. PATENT DOCUMENTS

| | | | |
|---|---|---|---|
| 6,352,797 B1* | 3/2002 | Yoshida | H01M 2/1653 29/623.1 |
| 2001/0014420 A1 | 8/2001 | Takeuchi et al. | |
| 2007/0148516 A1* | 6/2007 | Kuhn | H01M 8/0297 429/458 |
| 2008/0248394 A1* | 10/2008 | Inoue | H01M 2/1673 429/232 |
| 2008/0318133 A1* | 12/2008 | Matsuyama | H01M 4/13 429/300 |
| 2012/0034509 A1* | 2/2012 | Bae | H01M 2/1653 429/145 |
| 2012/0103661 A1* | 5/2012 | Narusawa | D06M 15/59 174/137 R |

FOREIGN PATENT DOCUMENTS

| | | |
|---|---|---|
| JP | 2002-313679 A | 10/2002 |
| JP | 2009-252497 A | 10/2009 |
| JP | 2011-110704 A | 6/2011 |
| WO | WO 97/35351 A1 | 9/1997 |

* cited by examiner

FIG. 2
(a)
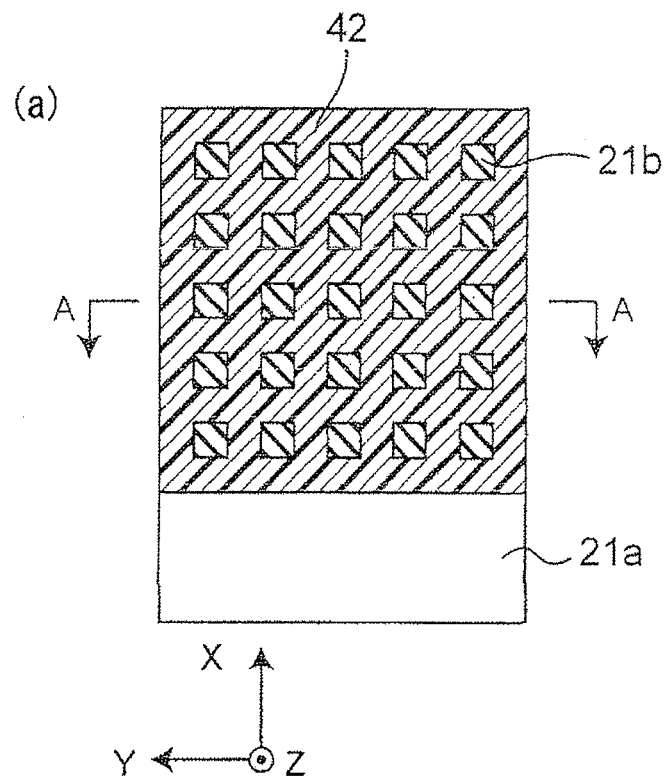
(b)
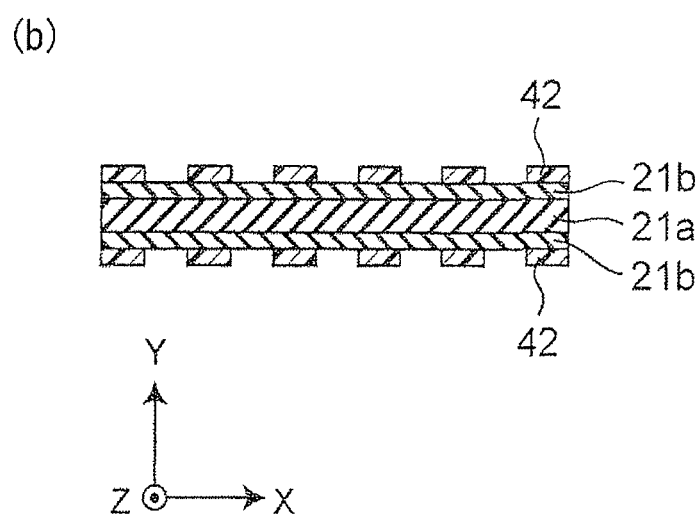

FIG. 3
(a)
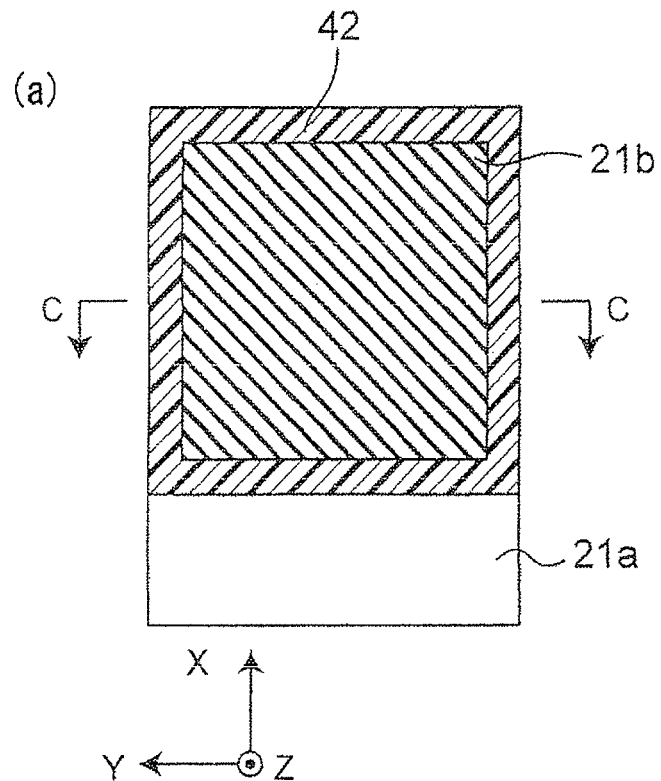
(b)
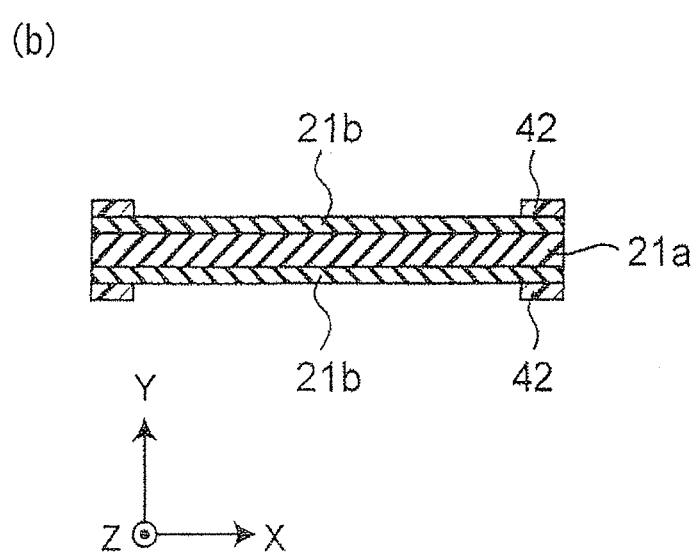

FIG. 5
(a)
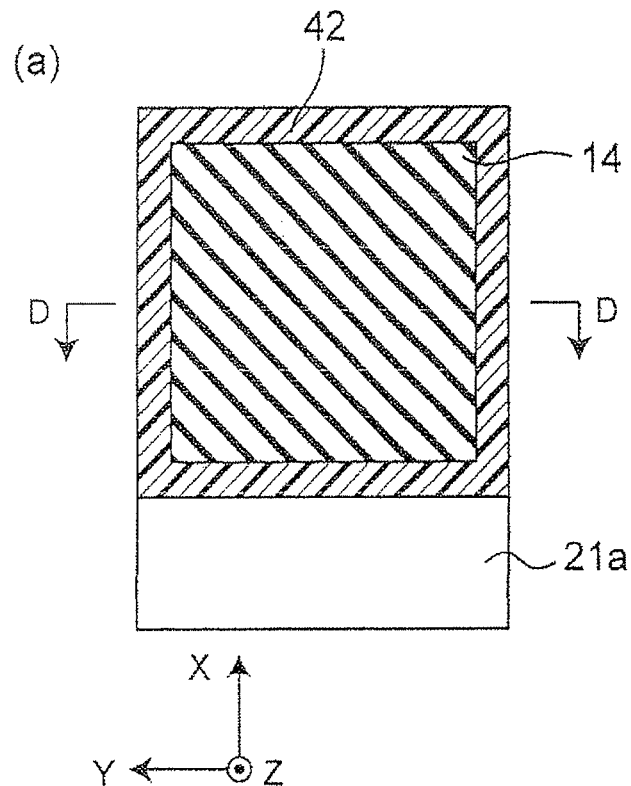
(b)
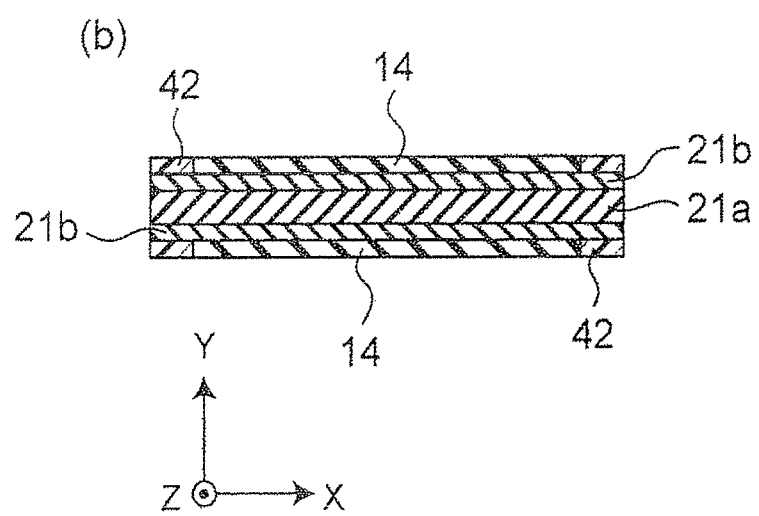

ELECTRIC STORAGE DEVICE AND METHOD FOR PRODUCING THE SAME

The present application is a continuation of PCT/JP2012/065983 filed Jun. 22, 2012, which claims priority to Japanese Patent Application No. 2011-143323, filed Jun. 28, 2011, the entire contents of each of which are incorporated herein by reference.

TECHNICAL FIELD OF THE INVENTION

The present invention relates to an electric storage device such as a capacitor or a battery and a method for producing the electric storage device.

BACKGROUND OF THE INVENTION

Existing electric storage devices having a high energy density represented by, for example, electric double layer capacitors and lithium-ion secondary batteries are produced by the following method.

Sheet-shaped electrodes are each produced by applying an active material such as active carbon, a lithium-containing double oxide, or carbon to a current-collecting foil constituted by a metal foil such as an aluminum foil or a copper foil.

Such two sheet-shaped electrodes are subsequently arranged such that the active-material layers thereof face each other and a sheet-shaped separator is interposed between the electrodes to prevent a short circuit caused by direct contact between the electrodes. Subsequently, the electrodes and the separator are wound or units each constituted by the electrodes and the separator are laminated to provide a laminated body in which pairs of the positive electrode and the negative electrode are laminated.

To these positive and negative electrodes, aluminum tabs or nickel tabs are welded as outer electrodes by ultrasonic welding or the like to provide electrode groups.

These electrode groups are placed in a package constituted by an aluminum can, an aluminum laminate film, or the like. The package is filled with an electrolytic solution and then sealed. Thus, an existing electric storage device is obtained.

However, use of such an existing method is difficult to achieve further reduction in the size or profile of electric storage devices.

Thus, Patent Document 1 discloses, as an electric storage device that allows further reduction in the size and profile, an electric double layer capacitor described below in detail.

Patent Document 1 discloses the electric double layer capacitor (electric storage device) as follows. Active carbon electrode layers are formed on surfaces of aluminum collector electrodes and the collector electrodes are arranged such that the active carbon electrode layers thereof face each other. The peripheries of these collector electrodes are provided with heat-bonding parts that are formed of, for example, modified polypropylene or modified polyethylene and that are melted by heating. A separator is disposed and an electrolytic solution is supplied between the collector electrodes. The heat-bonding parts are then heated to bond (thermocompression bond) the collector electrodes together and to seal the collector electrodes so as to contain the electrolytic solution therein. Thus, a unit cell (electric storage unit) is formed. Such unit cells are optionally laminated. Thus, the electric double layer capacitor is provided.

The heat-bonding parts have a function of maintaining the shape of a unit cell and preventing a short circuit caused by contact between collector electrodes. Thus, the heat-bonding parts allow further reduction in the size and profile of electric storage devices.

Patent Document 1: Japanese Unexamined Patent Application Publication No. 2002-313679

In the electric double layer capacitor (electric storage device) in Patent Document 1, the collector electrodes are sealed by completely covering the peripheries thereof. Accordingly, after the unit cell is formed by melting the heat-bonding parts, an electrolytic solution cannot be supplied into the unit cell (or laminated body).

For this reason, an electrolytic solution needs to be injected between collector electrodes prior to heating of the heat-bonding parts, that is, prior to formation of the unit cell. In this case, heat applied during thermocompression bonding may cause alteration or evaporation of the electrolytic solution.

In addition, after injection of the electrolytic solution and prior to thermocompression bonding, the electrolytic solution may leak during lamination of electrodes (collector electrodes) and adhere to equipment or the like, which causes difficulties in handling.

In the obtained electric storage device, the electrolytic solution is contained between the sealed collector electrodes. Accordingly, gas generated by decomposition of water or impurities in the electrolytic solution and the like is not discharged from the laminated body. Thus, the generated gas may cause, for example, swelling of the laminated body (in between electrodes), an increase in the impedance (internal resistance), a decrease in the capacitance, or separation between component members such as separation between a collector electrode and an active-material layer.

SUMMARY OF THE INVENTION

An object of the present invention is to provide an electric storage device in which reduction in the size and profile can be achieved and, after formation of a unit cell (electric storage unit), an electrolyte can be supplied into the unit cell (electric storage unit); and a method for producing the electric storage device.

Another object of the present invention is to provide an electric storage device in which gas generated in a unit cell (electric storage unit), particularly in between collector electrodes, can be discharged from the unit cell (electric storage unit); and a method for producing the electric storage device.

In order to achieve the objects, an electric storage device according to the present invention includes an electrolyte and an electric storage unit including a positive electrode including a positive-electrode collector electrode and a positive-electrode active-material layer disposed on the positive-electrode collector electrode; a negative electrode including a negative-electrode collector electrode and a negative-electrode active-material layer disposed on the negative-electrode collector electrode, the negative electrode being disposed such that the negative-electrode active-material layer faces the positive-electrode active-material layer; a first insulating layer bonded to a portion of a surface of the positive electrode and a portion of a surface of the negative electrode to isolate the positive electrode and the negative electrode from each other; and a region that is sealed with (closed by) the first insulating layer in plan view and that holds the electrolyte between the positive electrode and the negative electrode, wherein an air permeability P of the first insulating layer satisfies a formula (1) below $$1250 \ s/100 \ cc < P < 95000 \ s/100 \ cc \qquad (1).$$

In a collector device according to the present invention, the first insulating layer satisfies the formula (1) and, as a result, the first insulating layer has appropriate solution permeability for the electrolyte. Accordingly, the electrolyte can be supplied into an electric storage unit after formation of the electric storage unit and, when necessary, even after lamination of electric storage units. Thus, alteration and evaporation of the electrolyte caused by heat applied during thermocompression bonding for formation of electric storage units can be prevented.

In addition, the first insulating layer is bonded to a portion of a surface of the positive electrode and a portion of a surface of the negative electrode. Accordingly, the supplied electrolyte can come into contact with, in large areas, the positive electrode and the negative electrode. Thus, the size and profile of the electric storage device can be reduced.

The first insulating layer having solution permeability allows permeation of not only electrolyte but also gas therethrough. Accordingly, in an electric storage device including an electric storage unit including the first insulating layer having solution permeability (air permeability), during use of the electric storage device under supply of a current, gas generated by decomposition of water or impurities in the electrolyte and the like can be discharged through the first insulating layer to the outside of the electric storage unit. Accordingly, influences of the generation of gas can be advantageously suppressed, for example, swelling of the electric storage unit, an increase in the impedance (internal resistance), a decrease in the capacitance, and separation between component members of the electric storage unit such as separation between a collector electrode and an active-material layer.

In an electric storage device according to the present invention, the above-described first insulating layer may contain a particulate insulator.

In this case, during thermocompression bonding or during application of an external stress to the laminated body, isolation between the electrodes can be firmly maintained and a short-circuit can be suppressed. The film thickness of the first insulating layer formed by screen printing or the like is in proportion to the solid concentration of first insulating layer paste. The presence of a particulate insulator in the first insulating layer paste results in an increase in the solid concentration of the paste. Thus, the first insulating layer can be formed so as to have a large thickness and a short-circuit can be suppressed.

In an electric storage device according to the present invention, in the above-described region, a second insulating layer that is porous and has a lower air permeability P than the first insulating layer may be disposed.

When an electric storage device according to the present invention includes the second insulating layer, the electrolyte can permeate the second insulating layer with more certainty and leakage current can be suppressed with more certainty.

A method for producing an electronic device according to the present invention is a method for producing an electric storage device including an electrolyte and an electric storage unit including a positive electrode including a positive-electrode collector electrode and a positive-electrode active-material layer disposed on the positive-electrode collector electrode; a negative electrode including a negative-electrode collector electrode and a negative-electrode active-material layer disposed on the negative-electrode collector electrode, the negative electrode being disposed such that the negative-electrode active-material layer faces the positive-electrode active-material layer; a first insulating layer bonded to a portion of a surface of the positive electrode and a portion of a surface of the negative electrode to isolate the positive electrode and the negative electrode from each other; and a region that is sealed with the first insulating layer in plan view and that holds the electrolyte between the positive electrode and the negative electrode, the method including:

a step of forming the first insulating layer with a resin permeable to the electrolyte such that an air permeability P of the first insulating layer satisfies a formula (1) below $$1250 \ s/100 \ cc < P < 95000 \ s/100 \ cc \qquad (1),  \text{and}$$

a step of producing an electrode composite sheet in which a plurality of the positive-electrode collector electrodes or a plurality of the negative-electrode collector electrodes are integrated by using the first insulating layer.

In an electric storage device obtained by this production method, the first insulating layer satisfies the formula (1) and, as a result, the first insulating layer has appropriate solution permeability for the electrolyte. Accordingly, the electrolyte can be supplied into electric storage units even after formation of the electric storage units and lamination of the electric storage units. Thus, alteration and evaporation of the electrolyte caused by, for example, heat applied by thermocompression bonding during lamination can be prevented. In addition, the first insulating layer is bonded to a portion of a surface of the positive electrode and a portion of a surface of the negative electrode. Accordingly, the supplied electrolyte can come into contact with, in large areas, the positive electrode and the negative electrode. Thus, the size and profile of the electric storage device can be reduced.

In addition, the first insulating layer having solution permeability allows permeation of not only electrolyte but also gas therethrough. Accordingly, in an electric storage device including an electric storage unit including the first insulating layer having solution permeability (air permeability), during use of the electric storage device under supply of a current, gas generated by decomposition of water or impurities in the electrolyte and the like can be discharged through the first insulating layer to the outside of the electric storage unit. Accordingly, influences of the generation of gas can be advantageously suppressed, for example, swelling of the electric storage unit, an increase in the impedance (internal resistance), a decrease in the capacitance, and separation between component members of the electric storage unit such as separation between a collector electrode and an active-material layer.

The production method includes a step of producing an electrode composite sheet in which a plurality of collector electrodes including positive-electrode or negative-electrode active-material layers are integrated by using the first insulating layer. Accordingly, high productivity can be achieved, compared with cases where electrodes are individually produced one by one and laminated.

The plurality of collector electrodes are integrated by using the first insulating layer. Accordingly, even when the collector electrodes are formed so as to have a small thickness, the collector electrodes can be handled without destruction thereof while the predetermined arrangement and predetermined alignment are maintained. Thus, reduction in the size and profile of the electric storage device can be easily achieved.

A method for producing an electronic device according to the present invention is a method for producing an electric storage device including an electrolyte and an electric storage unit including a positive electrode including a positive-electrode collector electrode and a positive-electrode active-material layer disposed on the positive-electrode collector electrode; a negative electrode including a negative-electrode collector electrode and a negative-electrode active-material layer disposed on the negative-electrode collector electrode, the negative electrode being disposed such that the negative-electrode active-material layer faces the positive-electrode active-material layer; a first insulating layer bonded to a portion of a surface of the positive electrode and a portion of a surface of the negative electrode to isolate the positive electrode and the negative electrode from each other; and a region that is sealed with the first insulating layer in plan view and that holds the electrolyte between the positive electrode and the negative electrode, the method including:

a step of forming the first insulating layer with a resin permeable to the electrolyte such that an air permeability P of the first insulating layer satisfies a formula (1) below $$1250 \ s/100 \ cc < P < 95000 \ s/100 \ cc \quad (1), \text{ and}$$

a step of producing a positive electrode-negative electrode integrated sheet in which a plurality of the electric storage units are arranged in at least one direction and integrated, and subsequently dividing the electric storage units arranged in the at least one direction.

In an electric storage device obtained by this production method, the first insulating layer satisfies the formula (1) and, as a result, the first insulating layer has appropriate solution permeability for the electrolyte. Accordingly, the electrolyte can be supplied into electric storage units even after formation of the electric storage units and lamination of the electric storage units. Thus, alteration and evaporation of the electrolyte caused by heat applied by thermocompression bonding during lamination can be prevented. In addition, the first insulating layer is bonded to a portion of a surface of the positive electrode and a portion of a surface of the negative electrode. Accordingly, the supplied electrolyte can come into contact with, in large areas, the positive electrode and the negative electrode. Thus, the size and profile of the electric storage device can be reduced.

In addition, the first insulating layer having solution permeability allows permeation of not only electrolyte but also gas therethrough. Accordingly, in an electric storage device including an electric storage unit including the first insulating layer having solution permeability (air permeability), during use of the electric storage device under supply of a current, gas generated by decomposition of water or impurities in the electrolyte and the like can be discharged through the first insulating layer to the outside of the electric storage unit. Accordingly, influences of the generation of gas can be advantageously suppressed, for example, swelling of the electric storage unit, an increase in the impedance (internal resistance), a decrease in the capacitance, and separation between component members of the electric storage unit such as separation between a collector electrode and an active-material layer.

After the positive electrode-negative electrode integrated sheet in which a plurality of the electric storage units are integrated by using the first insulating layer is formed, this integrated sheet is cut to provide single or laminated electric storage units, and these units are used to produce electric storage devices. Accordingly, electric storage devices can be efficiently produced.

A method for producing an electronic device according to the present invention is a method for producing an electric storage device including an electrolyte and an electric storage unit including a positive electrode including a positive-electrode collector electrode and a positive-electrode active-material layer disposed on the positive-electrode collector electrode; a negative electrode including a negative-electrode collector electrode and a negative-electrode active-material layer disposed on the negative-electrode collector electrode, the negative electrode being disposed such that the negative-electrode active-material layer faces the positive-electrode active-material layer; a first insulating layer bonded to a portion of a surface of the positive electrode and a portion of a surface of the negative electrode to isolate the positive electrode and the negative electrode from each other; and a region that is sealed with the first insulating layer in plan view and that holds the electrolyte between the positive electrode and the negative electrode, the method including:

a step of forming the first insulating layer with a resin permeable to the electrolyte such that an air permeability P of the first insulating layer satisfies a formula (1) below $$1250 \ s/100 \ cc < P < 95000 \ s/100 \ cc \quad (1), \text{ and}$$

a step of, after formation of the electric storage unit, supplying the electrolyte into the electric storage unit by permeation of the electrolyte through the first insulating layer.

In an electric storage device obtained by this production method, the first insulating layer satisfies the formula (1) and, as a result, the first insulating layer has appropriate solution permeability for the electrolyte. Accordingly, the electrolyte can be supplied into electric storage units even after formation of the electric storage units and lamination of the electric storage units. Thus, alteration and evaporation of the electrolyte caused by heat applied by thermocompression bonding during lamination can be prevented. In addition, the first insulating layer is bonded to a portion of a surface of the positive electrode and a portion of a surface of the negative electrode. Accordingly, the supplied electrolyte can come into contact with, in large areas, the positive electrode and the negative electrode. Thus, the size and profile of the electric storage device can be reduced.

In addition, the first insulating layer having solution permeability allows permeation of not only electrolyte but also gas therethrough. Accordingly, in an electric storage device including an electric storage unit including the first insulating layer having solution permeability (air permeability), during use of the electric storage device under supply of a current, gas generated by decomposition of water or impurities in the electrolyte and the like can be discharged through the first insulating layer to the outside of the electric storage unit. Accordingly, influences of the generation of gas can be advantageously suppressed, for example, swelling of the electric storage unit, an increase in the impedance (internal resistance), a decrease in the capacitance, and separation between component members of the electric storage unit such as separation between a collector electrode and an active-material layer.

Since the electrolyte is supplied after formation of the laminated body, problems such as alteration and evaporation of the electrolyte due to, for example, heat applied during formation of the laminated body are not caused. In addition, the necessity of handling electric storage units containing the electrolyte during lamination has been eliminated. Thus, the process is simplified and efficient.

In the present invention, non-limiting examples of the electrolyte include electrolytic solutions containing supporting electrolytes, ionic liquids, and solid electrolytes such as gel electrolytes.

The present invention can provide an electric storage device in which reduction in the size and profile can be achieved and, after formation of a unit cell (electric storage unit), an electrolyte can be supplied into the laminated body; and a method for producing the electric storage device.

The present invention can also provide an electric storage device in which gas generated in a unit cell (electric storage unit), particularly in between collector electrodes, can be discharged from the unit cell (electric storage unit); and a method for producing the electric storage device.

BRIEF DESCRIPTION OF DRAWINGS

FIG. 2(a) is a plan view of a positive electrode illustrating the configuration of a first insulating layer 42 in an electric double layer capacitor 80 according to the present invention. FIG. 2(b) illustrates a section taken along line A-A in FIG. 2(a).

FIG. 3(a) is a plan view illustrating a modification in terms of the configuration of a first insulating layer 42. FIG. 3(b) illustrates a section taken along line C-C in FIG. 3(a).

FIG. 5(a) is a plan view illustrating an example where second insulating layers 14 are disposed in the embodiment in FIG. 3(a). FIG. 5(b) illustrates a section taken along line D-D in FIG. 5(a).

FIG. 6(a) is a plan view of positive-electrode active-material layers 21b formed on both surfaces of a positive-electrode collector electrode 21a. FIG. 6(b) is a sectional view illustrating the positive-electrode active-material layers 21b formed on both surfaces of the positive-electrode collector electrode 21a.

FIG. 10(1) is a sectional view of the base film 100 having a release layer 101; FIG. 10(2) is a sectional view illustrating formation of a positive-electrode collector film 102 on the release layer 101; FIG. 10(3) is a sectional view illustrating formation of resist patterns R102 on the positive-electrode collector film 102; FIG. 10(4) is a sectional view illustrating etching of the positive-electrode collector film 102; FIG. 10(5) is a sectional view illustrating removal of the resist patterns R102; FIG. 10(6a) is a sectional view illustrating formation of a positive-electrode active-material layer 21b on a positive-electrode collector electrode 21a; and FIG. 10(6b) is a plan view corresponding to FIG. 10(6a).

FIG. 11(7a) is a sectional view illustrating formation of second insulating layers 14 on a positive-electrode active-material layer 21b; FIG. 11(7b) is a plan view corresponding to FIG. 11(7a); and FIG. 11(8a) is a plan view illustrating formation of a negative electrode 31 on a base film.

FIG. 12(8b) is a sectional view corresponding to FIG. 11(8a); FIG. 12(9) is a sectional view of a negative-electrode composite sheet 30A; FIG. 12(10) is a sectional view illustrating a positive-electrode composite sheet 20A and the negative-electrode composite sheet 30A disposed so as to face each other; FIG. 12(11) is a sectional view of the positive electrode-negative electrode integrated sheet 50A in which first insulating layers 42 are bonded together between the positive-electrode composite sheet 20A and the negative-electrode composite sheet 30A; and FIG. 12(12) is a sectional view illustrating separation of a base film 100 on the positive-electrode side of the positive electrode-negative electrode integrated sheet 50A.

FIG. 13(13) is a sectional view illustrating two positive electrode-negative electrode integrated sheets 50A disposed so as to face each other; FIG. 13(14) is a sectional view of two positive electrode-negative electrode integrated sheets laminated; FIG. 13(15) is a sectional view illustrating separation of a base film 100 of one of the sheets; and FIG. 13(16) is a sectional view illustrating the laminated positive electrode-negative electrode integrated sheets 50A and another positive electrode-negative electrode integrated sheet 50A disposed thereon.

DETAILED DESCRIPTION OF THE PREFERRED EMBODIMENTS OF THE INVENTION

Figure 1:
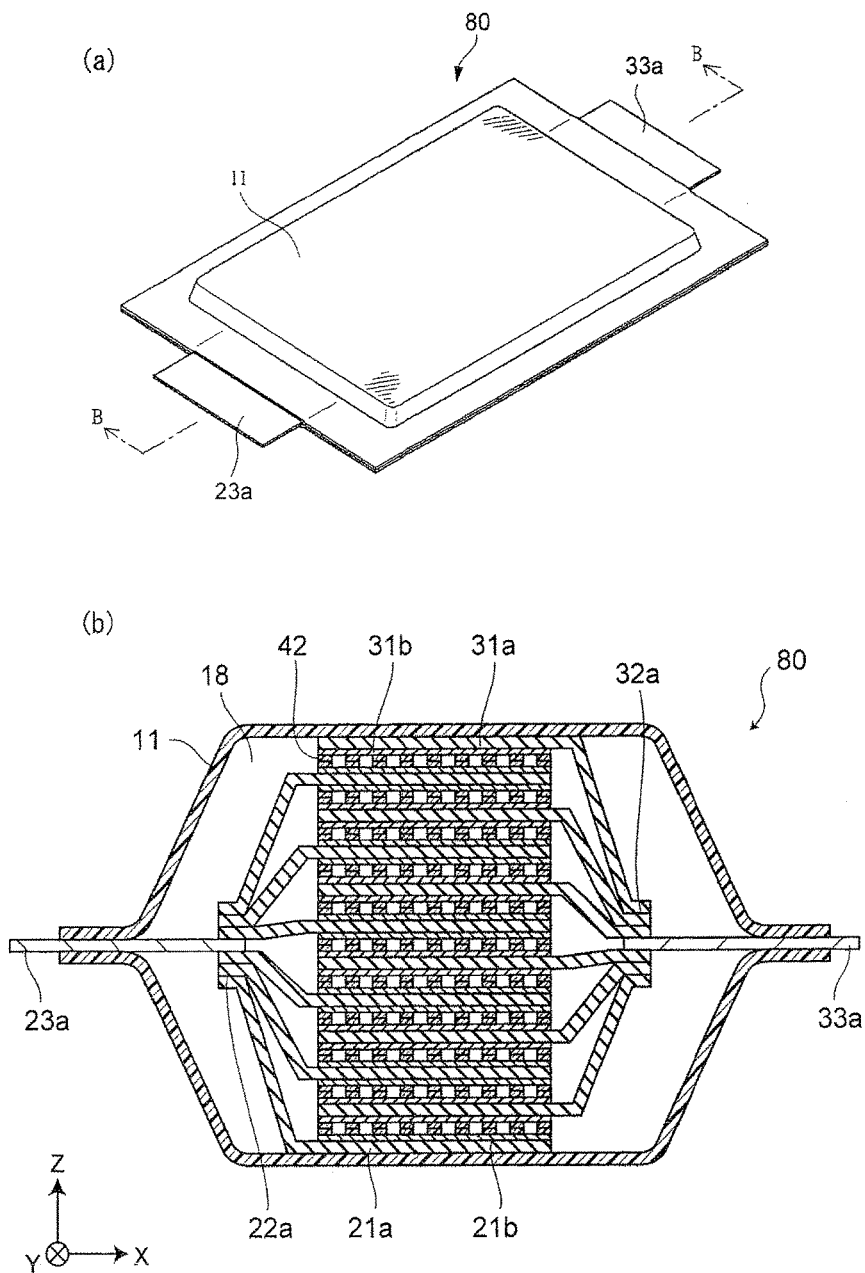
FIG. 1(a) is a perspective view illustrating the appearance of an electric storage device according to a first embodiment of the present invention, specifically, an electric double layer capacitor 80.
FIG. 1(b) illustrates a section taken along line B-B in FIG. 1(a).

Hereinafter, embodiments of the present invention will be described in detail with reference to drawings. In the following description, when necessary, terms representing specific directions or positions (for example, "upper", "lower", "right", "left", and other terms containing the foregoing) are used. These terms are used to facilitate understanding of the invention with reference to drawings. The meanings of these terms do not limit the technical scope of the present invention. Like reference signs in plural drawings are used to denote like parts or members.

1. First Embodiment (1) Electric Storage Device

FIG. 1(a) is a perspective view illustrating the appearance of an electric storage device according to a first embodiment of the present invention, specifically, an electric double layer capacitor 80. FIG. 1(b) illustrates a section taken along line B-B in FIG. 1(a).

The electric double layer capacitor 80 includes a positive-electrode collector electrode 21a on a surface of which a positive-electrode active-material layer 21b is formed, and a negative-electrode collector electrode 31a on a surface of which a negative-electrode active-material layer 31b is formed. The positive-electrode collector electrode 21a and the negative-electrode collector electrode 31a are arranged such that the positive-electrode active-material layer 21b and the negative-electrode active-material layer 31b face each other.

A first insulating layer 42 is disposed between the positive-electrode active-material layer 21b and the negative-electrode active-material layer 31b. The first insulating layer 42 is bonded to a portion of a surface of the positive-electrode active-material layer 21b and a portion of a surface of the negative-electrode active-material layer 31b. The presence of the first insulating layer 42 allows isolation between a positive electrode including the positive-electrode collector electrode 21a and the positive-electrode active-material layer 21b and a negative electrode including the negative-electrode collector electrode 31a and the negative-electrode active-material layer 31b. Thus, a short-circuit between the positive electrode and the negative electrode is suppressed.

An electrolyte 18 is supplied between the positive-electrode active-material layer 21b and the negative-electrode active-material layer 31b.

In this Description, a pair of a positive electrode (the positive-electrode collector electrode 21a and the positive-electrode active-material layer 21b) and a negative electrode (the negative-electrode collector electrode 31a and the negative-electrode active-material layer 31b) in which the positive-electrode active-material layer 21b and the negative-electrode active-material layer 31b face each other, and the first insulating layer 42 disposed between the positive electrode and the negative electrode so as to be bonded to a portion of the positive electrode and a portion of the negative electrode, may be collectively referred to as an "electric storage unit".

In the electric double layer capacitor 80 according to the present invention, between the positive-electrode active-material layer 21b and the negative-electrode active-material layer 31b, the electrolyte 18 is supplied (disposed) in a region surrounded (closed) by the first insulating layer 42. The first insulating layer 42 has solution permeability (air permeability) and allows permeation of the electrolyte 18 therethrough, which is a feature of the present invention.

The first insulating layer 42 preferably has an air permeability P satisfying a formula (1) below to thereby allow permeation of the electrolyte 18 at a predetermined rate (to have a predetermined solution permeability for the electrolyte 18).

$$1250 \, s/100 \, cc < P < 95000 \, s/100 \, cc \tag{1}$$

where P represents the air permeability (s/cc) of the first insulating layer 42.

Hereafter, features of the electric double layer capacitor 80 will be described in detail.

FIG. 2(a) is a plan view of a positive electrode illustrating the configuration of the first insulating layer 42 in the electric double layer capacitor 80 according to the present invention. FIG. 2(b) illustrates a section taken along line A-A in FIG. 2(a).

As is seen from FIG. 2(a), the positive-electrode active-material layers 21b are formed on the surfaces of the positive-electrode collector electrode 21a (both surfaces in FIGS. 2(a) and 2(b)) except for collector lead portions that are to be used for forming welded portions (for example, welded portions 22a and 32a in FIG. 1). The first insulating layer 42 is disposed on (bonded to) each positive-electrode active-material layer 21b in a regular grid pattern.

As a result of disposition of the first insulating layer 42 illustrated in FIGS. 2(a) and 2(b), plural portions on which the first insulating layer 42 is not disposed are generated in the positive-electrode active-material layer 21b. Each of these plural portions has a square shape in plan view. That is, exposed portions of the positive-electrode active-material layer 21b each have a square shape in plan view and are individually surrounded by frame-shaped portions of the first insulating layer 42.

This means that the first insulating layer 42 forms sealed regions in plan view. These regions have a function of holding the electrolyte between the positive electrode and the negative electrode in the electric storage unit.

FIGS. 2(a) and 2(b) illustrates the positive electrode. As illustrated in FIG. 1, as with the positive electrode, the negative electrode has the following configuration: the negative-electrode active-material layer 31b is formed on a surface of the negative-electrode collector electrode 31a; and the first insulating layer 42 is formed on (bonded to) the negative-electrode active-material layer 31b so as to face the first insulating layer 42 formed on the positive-electrode active-material layer 21b.

Thus, regions are formed between the first insulating layers 42 in FIG. 1(b). The upper portion of each region is covered by one of the positive-electrode active-material layer 21b and the negative-electrode active-material layer 31b; the lower portion of the region is covered by the other one of the positive-electrode active-material layer 21b and the negative-electrode active-material layer 31b; and the side surfaces of the region are covered (surrounded) by the first insulating layers 42. Apparently, the electrolyte 18 cannot enter the region (that is, in plan view, the first insulating layers 42 have sealed regions; one of the upper and lower surfaces of each sealed region is covered by the positive electrode and the other one is covered by the negative electrode). Actually, as described above, the first insulating layers 42 allow permeation of the electrolyte 18 therethrough. Accordingly, after electric storage units are formed, the electrolyte 18 can be supplied to these regions.

In addition, during use of the electric double layer capacitor 80 under supply of a current, gas generated in electric storage units by decomposition of water or impurities in the electrolyte 18 and the like can be discharged through the first insulating layers 42 to the outside of the electric storage units. Accordingly, influences of the generation of gas can be advantageously suppressed, for example, swelling of the electric storage units, an increase in the impedance (internal resistance), a decrease in the capacitance, and separation between component members of the electric storage units such as separation between a collector electrode and an active-material layer.

As described above, the air permeability P of the first insulating layers 42 satisfies the formula (1).

When the air permeability P is less than 95000 s/100 cc, the first insulating layers 42 have a higher permeability for the electrolyte and hence the electrolyte can be efficiently supplied into electric storage units in a mass production process. When the air permeability P is less than 95000 s/100 cc, gas generated in electric storage units can be efficiently discharged from the electric storage units.

When the air permeability P is more than 1250 s/100 cc, the first insulating layers 42 have sufficiently high strength and hence the shape of electric storage units can be maintained with higher stability.

The air permeability P can be measured by a method in compliance with Japanese Industrial Standard (JIS) P 8117. For example, the air permeability P can be measured with a Digital Oken Type Air-permeability tester ("EG01-5-1MR" manufactured by ASAHI SEIKO CO., LTD.) with a cylinder pressure of 0.25 MPa, a measurement pressure of 0.05 MPa, and a measurement inner diameter of 30 mm.

For the measurement, a first insulating layer 42 is formed so as to have the same thickness and the same material as the first insulating layers 42 used in the electric storage device, but so as to have a larger area than these first insulating layers 42. This first insulating layer 42 is measured.

As is also seen from FIG. 1, the supply (permeation) of the electrolyte 18 into the regions surrounded by the first insulating layers 42 can be performed even after lamination of electric storage units. By supplying the electrolyte 18 into electric storage units having been laminated, problems such as alteration and evaporation of the electrolyte 18 caused by, for example, heat applied during lamination of electric storage units by thermocompression bonding can be prevented.

Existing insulating layers substantially have no solution permeability for electrolytic solutions. Thus, after a frame-shaped insulating layer is bonded to a positive electrode and a negative electrode to form an electric storage unit, an electrolytic solution cannot be injected into the electric storage unit.

For this reason, prior to formation of the electric storage unit, the electrolytic solution needs to be injected into a region (sealed region in plan view) formed with the frame-shaped insulating layer and used for holding the electrolytic solution.

In contrast, in the electric double layer capacitor 80, as described above, the necessity of supplying the electrolyte 18 prior to formation of an electric storage unit has been eliminated. Accordingly, the necessity of handling an electric storage unit containing the electrolyte 18 in a sealed region in plan view formed by a frame-shaped first insulating layer during formation of the electric storage unit has been eliminated. Thus, the process is simplified and efficient.

However, in the production of the electric double layer capacitor 80, supply of the electrolyte 18 to an electric storage unit is not limited to after formation of the electric storage unit. The electrolyte 18 may be supplied prior to formation of an electric storage unit and/or during formation of the electric storage unit, and may be additionally supplied after formation of the electric storage unit.

A non-limiting example of the configuration of the first insulating layers 42 is illustrated in FIG. 1(b) and FIG. 2. Alternatively, such a first insulating layer 42 may be disposed in any configuration as long as the first insulating layer 42 is bonded to a portion of a surface of the positive electrode (the positive-electrode active-material layer 21b and/or the positive-electrode collector electrode 21a) and a portion of a surface of the negative electrode (the negative-electrode active-material layer 31b and/or the negative-electrode collector electrode 31a); the first insulating layer 42 is disposed between the positive electrode (the positive-electrode active-material layer 21b) and the negative electrode (the negative-electrode active-material layer 31b) so as to surround the electrolyte 18 in plan view (when viewed in the Z-axis direction in FIG. 1(b)); and the electrolyte 18 surrounded can come into contact with the positive-electrode active-material layer 21b and the negative-electrode active-material layer 31b.

FIG. 3(a) is a plan view illustrating a modification in terms of the configuration of the first insulating layers 42. FIG. 3(b) illustrates a section taken along line C-C in FIG. 3(a).

In the modification in FIG. 3(a), as in the embodiment in FIGS. 2(a) and 2(b), the positive-electrode active-material layers 21b are formed on the surfaces (both surfaces) of the positive-electrode collector electrode 21a.

On the surface of each positive-electrode active-material layer 21b, the first insulating layer 42 having a square-frame shape in plan view is disposed. That is, the first insulating layer 42 is disposed on the main surface of the positive-electrode active-material layer 21b so as to conform to the periphery of the positive-electrode active-material layer 21b.

Such a square-frame-shaped first insulating layer 42 may be formed not only on the positive-electrode active-material layer 21b in FIG. 3(b) but also on portions of the positive-electrode collector electrode 21a where the positive-electrode active-material layer 21b is not formed. When the configuration of the first insulating layers 42 in FIGS. 3(a) and 3(b) is employed, needless to say, for the negative electrode, the first insulating layers 42 are generally formed at corresponding positions on the negative-electrode active-material layers 31b.

Figure 4:
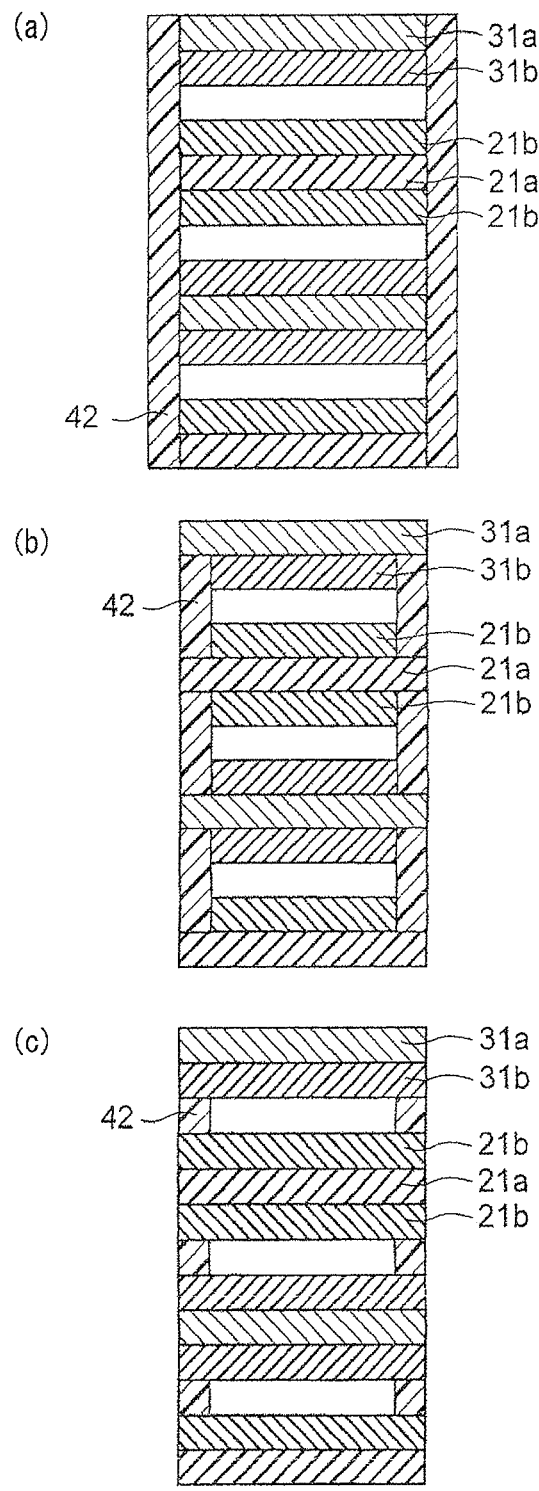
FIGS. 4(a) to 4(c) includes sectional views illustrating examples of laminated electric storage units in which a first insulating layer 42 is disposed near the periphery of at least one of a positive-electrode collector electrode 21a, a positive-electrode active-material layer 21b, a negative-electrode collector electrode 31a, and a negative-electrode active-material layer 31b.

FIGS. 4(a) to 4(c) includes sectional views illustrating examples of laminated electric storage units in which the first insulating layer 42 is disposed near the periphery of at least one of the positive-electrode collector electrode 21a, the positive-electrode active-material layer 21b, the negative-electrode collector electrode 31a, and the negative-electrode active-material layer 31b.

In the example in FIG. 4(a), the first insulating layer 42 is bonded to the side surfaces of the positive-electrode collector electrodes 21a, the positive-electrode active-material layers 21b, the negative-electrode collector electrodes 31a, and the negative-electrode active-material layers 31b. As a result, the first insulating layer 42 extends over electric storage units that are laminated.

In the example in FIG. 4(b), each first insulating layer 42 is bonded to main surfaces of the positive-electrode collector electrode 21a and the negative-electrode collector electrode 31a and is bonded to the side surfaces of the positive-electrode active-material layer 21b and the negative-electrode active-material layer 31b.

In the example in FIG. 4(c), each first insulating layer 42 is bonded to main surfaces of the positive-electrode active-material layer 21b and the negative-electrode active-material layer 31b (that is, this example corresponds to a case where electric storage units are formed in accordance with the embodiment in FIGS. 3(a) and 3(b) and the electric storage units are laminated).

In the examples of FIGS. 4(b) and 4(c), the first insulating layer 42 is within a single electric storage unit and does not extend over electric storage units.

In the electric double layer capacitor 80 according to the present invention, as illustrated in FIG. 1 and as described above, the positive electrode (in particular, the positive-electrode active-material layer 21b) and the negative electrode (in particular, the negative-electrode active-material layer 31b) are just partially covered by the first insulating layers 42; and it is not necessary for a porous insulating layer (separator layer) or the like to be disposed between the electrodes. That is, the electrolyte 18 only is present between large surface-area portions of the positive-electrode active-material layer 21b and the negative-electrode active-material layer 31b. Accordingly, the resistance between the electrodes can be advantageously made low.

Since it is not necessary for a porous insulating layer (separator layer) to be disposed between the electrodes by coating or the like, the first insulating layer can be simply formed for the production of the device. Accordingly, the number of component members of the electric storage device can be decreased and the production cost can be decreased.

A second insulating layer (separator layer) that is porous may be disposed between the electrodes. In this case, because of the presence of the second insulating layer, the probability of the occurrence of a short circuit due to, for example, separation of active materials from the positive-electrode active-material layer 21b and the negative-electrode active-material layer 31b is decreased. Thus, electric storage devices can be provided in high yield or electric storage devices having a low leakage current can be provided.

FIG. 5(a) is a plan view illustrating an example where second insulating layers 14 are disposed in the embodiment in FIG. 3(a). FIG. 5(b) illustrates a section taken along line D-D in FIG. 5(a). In the embodiment in FIGS. 5(a) and 5(b), as in FIGS. 3(a) and 3(b), the positive-electrode active-material layers 21b are formed on the positive-electrode collector electrode 21a; and the first insulating layer 42 having a square-frame shape is formed on the periphery of the main surface of each positive-electrode active-material layer 21b.

In addition, separator layers (second insulating layers) 14 are formed on surface portions of the positive-electrode active-material layers 21b where the first insulating layers 42 are not formed.

As illustrated in FIGS. 5(a) and 5(b), the second insulating layers 14 may be entirely formed on the surface portions of the positive-electrode active-material layers 21b where the first insulating layers 42 are not formed. Alternatively, the second insulating layers 14 may be partially formed on the surface portions of the positive-electrode active-material layers 21b where the first insulating layers 42 are not formed.

Similarly, in the embodiment illustrated in FIG. 2, the second insulating layers 14 may be entirely or partially formed on the surface portions of the positive-electrode active-material layers 21b where the first insulating layers 42 are not formed.

A decrease in the resistance of an electric storage device is effectively achieved by forming the separator layers (second insulating layers) 14 so as to have more pores or the like to thereby decrease the resistance value between the electrodes. However, for example, in the case of a separator containing a particulate material and a resin component, a separator layer having a low resistance needs to be formed with a low content of the resin component so that pores are not filled with the resin component.

On the other hand, in order to bond together the electrodes with the resin component of a separator layer to provide an electric storage unit, adhesiveness derived from the resin component of the separator layer is necessary. That is, in order to provide high adhesiveness, the content of the resin component needs to be increased.

In summary, the content of the resin component needs to be decreased for achieving low resistance, whereas the content of the resin component needs to be increased for achieving high adhesiveness. The achievements of both low resistance and high adhesiveness are contradictory in view of the content of the resin component. Accordingly, it has been difficult to produce a separator having low resistance and high adhesiveness.

However, in the present invention, the first insulating layer 42 and the second insulating layer (separator layer) having different functions may be separately formed and disposed. The first insulating layer 42 has high adhesiveness for maintaining the shape of the electric storage device. The second insulating layer (separator layer) is porous, has a low content of a resin component, and has a low resistance. In this case, compared with a case where "a separator layer having adhesiveness" having a high content of a resin component is disposed between the electrodes, the resistance can be decreased (this is because the separator layer having adhesiveness has a high content of a resin component and hence the resistance value is high).

However, a case where the second insulating layer has adhesiveness is not excluded. When the second insulating layer also has adhesiveness, bonding between electrodes is strengthened.

In this Description, the porous second insulating layer (separator layer) 14 has a lower air permeability P (allows permeation of 100 cc of gas in a shorter time) than the first insulating layer 42.

That is, in this Description, the second insulating layer (separator layer) 14 has a higher solution permeability for the electrolyte 18 than the first insulating layer 42.

The second insulating layer 14 preferably has many pores or the like to achieve a decrease in the resistance value between the electrodes. Thus, the air permeability P of the second insulating layer 14 is preferably more than 0 s/100 cc and less than 1000 s/100 cc.

In the electric double layer capacitor 80, the above-described electric storage units may be laminated in parallel to increase the capacitance. In order to minimize the volume and to maximize the capacitance, as illustrated in FIG. 1, the positive-electrode active-material layer 21b is preferably formed on both surfaces of the positive-electrode collector electrode 21a; and the negative-electrode active-material layer 31b is preferably formed on both surfaces of the negative-electrode collector electrode 31a. However, in this embodiment, regarding the positive-electrode collector electrode 21a and the negative-electrode collector electrode 31a that are positioned as the outermost layers in the height direction (Z direction in FIG. 1) (in FIG. 1, the uppermost negative-electrode collector electrode 31a and the lowermost positive-electrode collector electrode 21a), single surfaces thereof are preferably provided with the active-material layers. In this way, active-material layers that do not face counter electrodes and substantially do not contribute to the capacitance of the electric storage device are not formed. As a result, the capacitance per volume in the electric storage device can be increased.

Plural electric storage units (11 units in FIG. 1) are laminated. End portions of the positive-electrode collector electrodes 21a of the electric storage units are integrally welded to form the welded portion 22a. The positive-electrode collector electrodes 21a are electrically connected through the welded portion 22a to a positive-electrode tab 23a. Similarly, end portions of the negative-electrode collector electrodes 31a of the electric storage units are integrally welded to form the welded portion 32a. The negative-electrode collector electrodes 31a are electrically connected through the welded portion 32a to a negative-electrode tab 33a.

The laminated electric storage units are contained in a package 11. The electrolyte 18 introduced into the package permeates through the first insulating layers 42 as described above and supplied into the electric storage units.

The positive-electrode tab 23a and the negative-electrode tab 33a extend from the inside of the package 11 to the outside. The electric storage units are electrically connected through the positive-electrode tab 23a and the negative-electrode tab 33a to the outside of the package.

As described above, the electric storage device (electric double layer capacitor) 80 including plural electric storage units is contained in the package 11. As a result, evaporation of the electrolyte 18 is suppressed.

In addition, during use of the electric double layer capacitor 80 under supply of a current, gas generated by decomposition of water or impurities in the electrolyte 18 and the like can be discharged through the first insulating layers 42 to the outside of the electric storage units. Accordingly, influences of the generation of gas can be advantageously suppressed, for example, swelling of the electric storage units, an increase in the impedance (internal resistance), a decrease in the capacitance, and separation between component members of the electric storage units such as separation between a collector electrode and an active-material layer.

An electric double layer capacitor according to the present invention is not limited to the configuration in FIGS. 1(a) and 1(b) in which electric storage units are laminated. For example, electric double layer capacitors (electric storage devices) in which electric storage units are not laminated are also encompassed within the present invention. Examples of such electric double layer capacitors (electric storage devices) include an electric double layer capacitor (electric storage device) that has, as a positive electrode and a negative electrode, only a single pair of a positive electrode in which the positive-electrode active-material layer 21b is formed only on a single surface of the positive-electrode collector electrode 21a and a negative electrode in which the negative-electrode active-material layer 31b is formed only on a single surface of the negative-electrode collector electrode 31a.

Hereinafter, elements of the electric double layer capacitor 80 will be described in detail.

Positive-electrode collector electrode, negative-electrode collector electrode, positive-electrode active-material layer, and negative-electrode active-material layer.

The electric double layer capacitor 80 has been described as an example of an electric storage device according to the present invention. However, the present invention is not limited to the electric double layer capacitor 80. The present invention encompasses various devices having an electric storage function such as lithium-ion secondary batteries and lithium-ion capacitors.

For example, in the case of an electric double layer capacitor, aluminum foils may be used as the positive-electrode collector electrode 21a and the negative-electrode collector electrode 31a; and active carbon may be used for the positive-electrode active-material layer 21b and the negative-electrode active-material layer 31b.

In this case, the electrolyte 18 may be, for example, an electrolytic solution containing 1 mol/L of triethylmethylammonium tetrafluoroborate in propylene carbonate.

For example, a lithium-ion secondary battery can be obtained: the positive electrode is prepared by using an aluminum foil as the positive-electrode collector electrode 21a and by using a mixture layer containing a lithium-containing double oxide such as $LiCoO_2$ as the positive-electrode active-material layer 21b; and the negative electrode is prepared by using a copper foil as the negative-electrode collector electrode 31a and by using a mixture layer containing graphite as the negative-electrode active-material layer 31b. In this case, the electrolyte 18 may be, for example, an electrolytic solution containing 1 mol/L $LiPF_6$ in a solvent mixture of ethylene carbonate (30 vol %) and diethyl carbonate (70 vol %).

For example, a lithium-ion capacitor can be obtained: the positive electrode is prepared by using an aluminum foil as the positive-electrode collector electrode 21a and by using a mixture layer containing active carbon as the positive-electrode active-material layer 21b; the negative electrode is prepared by using a copper foil as the negative-electrode collector electrode 31a and by using a mixture layer containing graphite as the negative-electrode active-material layer 31b; and the negative electrode is pre-doped with lithium ions.

In this case, the electrolyte 18 may be, for example, an electrolytic solution containing 1 mol/L $LiPF_6$ in a solvent mixture of ethylene carbonate (30 vol %) and diethyl carbonate (70 vol %).

First Insulating Layer

The first insulating layer 42 may be formed of a thermoplastic resin (such as polyvinylidene fluoride (hereafter, PVDF)) or a thermosetting resin such as polyimide, polyamide-imide, or polyamide.

Of these, thermoplastic resins are preferred because they are softened by being heated to the glass transition temperature or the melting point; accordingly, when such a thermoplastic resin is subjected to heating or thermocompression bonding, a large contact area is achieved between the thermoplastic resin and its bonding target, that is, the positive-electrode active-material layer 21b, the negative-electrode active-material layer 31b, the positive-electrode collector electrode 21a, the negative-electrode collector electrode 31a, or a separator layer (when used); thus, high adhesive strength (bonding strength) can be achieved. Needless to say, by heating a thermoplastic resin to the glass transition temperature or the melting point, even when the first insulating layers 42 are bonded together, this bonding can be easily achieved and high bonding strength can be achieved.

The first insulating layer 42 that satisfies the formula (1) can be formed by, for example, selecting an appropriate thermoplastic resin and optionally adding a predetermined amount of a particulate insulator to the thermoplastic resin.

An example of the combination of a thermoplastic resin and a particulate insulator is as follows. The thermoplastic resin is a copolymer of PVDF and propylene hexafluoride. The particulate insulator is formed of alumina (for example, particle size $D_{50}$=0.3 μm). A volume ratio PVC (pigment volume concentration) of the particulate insulator to the total of the particulate insulator and the resin is adjusted to be more than 30% and less than 60% (30%<PVC<60%).

When a particulate insulator is used, other than this example, combinations of various thermoplastic resins or thermosetting resins and particulate insulators may be employed; and, by appropriately adjusting PVC to satisfy, for example, 30%<PVC<60%, the formula (1) can be satisfied.

During formation of the first insulating layer 42, in order to mix a thermoplastic resin and a particulate insulator, a solvent such as 1-methyl-2-pyrrolidone (hereafter NMP) may be used.

Examples of the particulate insulator include organic particles formed of polytetrafluoroethylene (PTFE), an inorganic filler formed of silica or alumina, and mixtures of the foregoing. In order to achieve a heat resistance that is sufficiently high for surface mounting, inorganic fillers are preferably used. More preferably, when insulator particles that are three-dimensionally irregularly shaped such as crushed silica particles are used, more pores tend to be formed between the particles. Accordingly, even when PVC is low, pores can be ensured and solution permeability can be ensured with more certainty.

When PVDF is used as a thermoplastic resin, high heat resistance and high solvent resistance are provided.

Thermosetting resins have high heat resistance, high bonding strength, and high chemical stability and have higher strength than thermoplastic resins. Accordingly, the strength of laminated bodies is increased.

The first insulating layer 42 can be bonded to the above-described bonding target by, for example, subjecting an electrode on which the first insulating layer 42 is formed to compression bonding or heating. As a result of compression bonding or heating, the first insulating layer 42 is bonded to and integrated with the bonding target (positive electrode, negative electrode, or the like). By applying heat during compression bonding, bonding can be more firmly achieved.

When electrodes having the first insulating layers 42 thereon are laminated to form a laminated body, preliminary bonding is performed (by heating or the like) during sequential lamination of the electrodes to form a preliminary laminated body; and the preliminary laminated body is subjected to actual bonding (by heating or the like).

In this way, during lamination, sequential lamination can be performed such that the positive electrode and the negative electrode are accurately aligned.

The actual bonding may be performed for a lamination assembly (preliminarily bonded) including plural laminated bodies. Alternatively, after the preliminarily bonded lamination assembly is divided into laminated bodies, each laminated body may be subjected to the actual bonding.

Electrolyte

The device containing the electrolyte 18 functions as an electric storage device.

Regarding the electrolyte 18 of an electric storage device, in the case of producing a lithium-ion secondary battery, electrolytes that are generally used for lithium-ion secondary batteries can be used; in the case of producing a lithium-ion capacitor, electrolytes that are generally used for lithium-ion capacitors can be used; and, in the case of producing an electric double layer capacitor, electrolytes that are generally used for electric double layer capacitors can be used.

Examples of electrolytes include electrolytic solutions that are generally used in electric storage devices: an electrolytic solution in which a Li salt such as $LiPF_6$, $LiBF_4$, or LiTFSI is dissolved in an organic solvent selected from dimethyl carbonate, diethyl carbonate, methylethyl carbonate, propylene carbonate, and acetonitrile, or in a solvent mixture of the foregoing; and an electrolytic solution in which tetramethylammonium tetrafluoroborate, triethylmethylammonium tetrafluoroborate, 1-ethyl-3-methylimidazolium tetrafluoroborate, or 1-ethyl-3-methylimidazolium bis(trifluoromethanesulfonyl)imide is dissolved in the above-described organic solvent.

For an electric double layer capacitor, when an ionic liquid such as 1-ethyl-3-methylimidazolium tetrafluoroborate or 1-ethyl-3-methylimidazolium bis(trifluoromethanesulfonyl)imide is used as the electrolyte, the ionic liquid itself that substantially does not contain organic solvents can be used as the electrolyte. When such an ionic liquid that substantially does not contain organic solvents is used, the ionic liquid has a low vapor pressure even at high temperatures and hence swelling at high temperatures can be suppressed and electric storage devices having high heat resistance can be provided. Compared with 1-ethyl-3-methylimidazolium bis(trifluoromethanesulfonyl)imide and the like, 1-ethyl-3-methylimidazolium tetrafluoroborate has a small radius of the anion, which is tetrafluoroborate, and has high conductivity. Accordingly, an electric double layer capacitor having a lower resistance can be provided.

Package

The package 11 may be, for example, a film. This film may be any film in which the interior (surfaces facing a laminated body) has insulating properties and the electrolyte 18 can be held.

A preferred example of the film is an aluminum laminate film in which the inner surfaces are covered by a polypropylene layer and the outer surfaces are covered by a nylon layer.

Second Insulating Layer (Separator Layer)

When the porous second insulating layer (separator layer) 14 is used, as described above, the second insulating layer (separator layer) 14 has a lower air permeability P (allows permeation of 100 cc of gas in a shorter time) than the first insulating layer 42.

This second insulating layer (separator layer) 14 having a lower air permeability P than the first insulating layer 42 can be obtained by, for example, selecting an appropriate thermoplastic resin and adding a predetermined amount of a particulate insulator to the thermoplastic resin.

An example of the combination of a thermoplastic resin and a particulate insulator is as follows. The thermoplastic resin is a copolymer of PVDF and propylene hexafluoride. The particulate insulator is formed of alumina (for example, particle size $D_{50}$=0.3 μm). A volume ratio PVC (pigment volume concentration) of the particulate insulator to the total of the particulate insulator and the resin is adjusted to be more than 60% (60%<PVC). Thus, the air permeability P is adjusted to be a value less than 1250 s/100 cc.

Other than this example, combinations of various thermoplastic resins or thermosetting resins and particulate insulators may be employed; and, by appropriately adjusting PVC to satisfy, for example, 60%<PVC, the second insulating layer 14 having a lower air permeability P than the first insulating layer 42 can be obtained.

During formation of the second insulating layer 14, a thermoplastic resin and a particulate insulator may be mixed with a solvent such as NMP.

Examples of the particulate insulator include organic particles formed of polytetrafluoroethylene (PTFE), an inorganic filler formed of silica or alumina, and mixtures of the foregoing. In order to achieve a heat resistance that is sufficiently high for surface mounting, inorganic fillers are preferably used. More preferably, when insulator particles that are three-dimensionally irregularly shaped such as crushed silica particles are used, more pores tend to be formed between the particles. Accordingly, even when PVC is low, pores can be ensured and solution permeability can be ensured with more certainty.

Even when a second insulating layer 14 other than the above-described example is used, the second insulating layer 14 preferably contains a particulate insulator. When the second insulating layer contains a particulate insulator, contraction of the second insulating layer or elimination of pores can be suppressed even during compression of layers in a lamination step or the like. Thus, while insulation between the positive electrode and the negative electrode is efficiently achieved, a decrease in the resistance can be achieved.

Examples of the particulate insulator include organic particles formed of PTFE, an inorganic filler formed of silica or alumina, and mixtures of the foregoing. Inorganic fillers are preferably used because a heat resistance that is sufficiently high for surface mounting can be achieved and pores can be more efficiently maintained due to high hardness during thermocompression bonding of the laminated body. More preferably, when insulator particles that are three-dimensionally irregularly shaped such as crushed silica particles are used, more pores tend to be formed between the particles. Accordingly, conduction paths for ions are ensured and a decrease in the resistance of the electric storage device can be achieved.

The second insulating layer can be formed by applying slurry containing components of the second insulating layer to the positive electrode and the negative electrode, or the positive electrode, or the negative electrode. This application for the second insulating layer may be performed by a comma coater method, a die coater method, a gravure printing method, or the like. Preferably, the second insulating layer is formed by application using a screen printing method.

(2) Production Method

Hereinafter, a method for producing the electric double layer capacitor 80 will be described as an example of a method for producing the electric storage device according to the embodiment.

Figure 6:
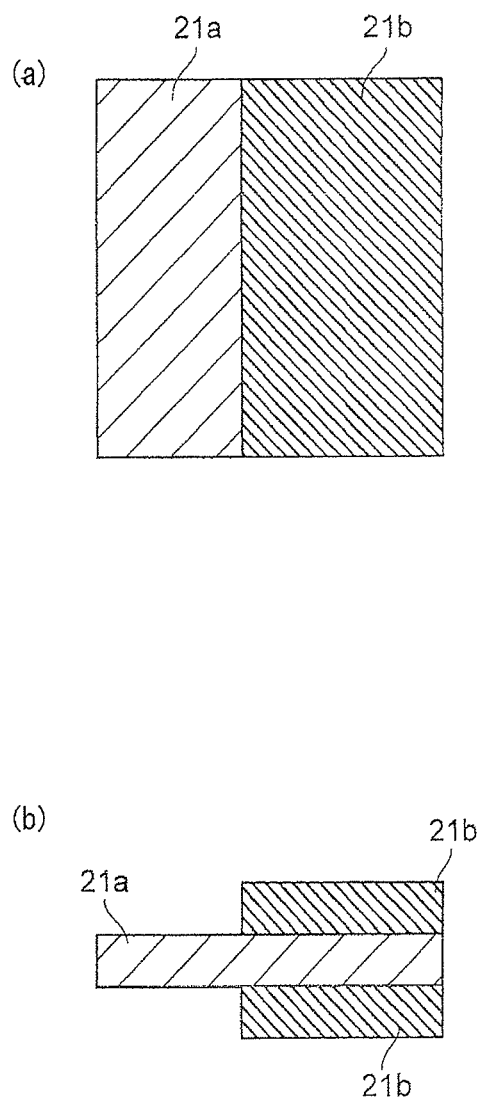

FIG. 6(a) is a plan view of the positive-electrode active-material layers 21b formed on both surfaces of the positive-electrode collector electrode 21a. FIG. 6(b) is a sectional view illustrating the positive-electrode active-material layers 21b formed on both surfaces of the positive-electrode collector electrode 21a.

A material for the positive-electrode active-material layers 21b (described above in detail) such as paste containing active carbon is applied by screen printing or the like to both surfaces of the positive-electrode collector electrode 21a (described above in detail) (for the lowermost electrode, a single surface alone) constituted by an aluminum foil or the like, and dried. Thus, the positive-electrode active-material layers 21b can be formed on both surfaces of the positive-electrode collector electrode 21a.

In general, as illustrated in FIGS. 1(a) and 1(b), in the positive-electrode collector electrode 21a, a lead portion that is to be used for forming the welded portion 22a is left without forming the positive-electrode active-material layers 21b.

By using a similar method, the negative-electrode active-material layers 31b can be formed on both surfaces of the negative-electrode collector electrode 31a (for the uppermost electrode, a single surface alone).

In this way, the positive electrode and the negative electrode can be obtained.

Subsequently, for example, a desired resin selected from the above-described thermoplastic resins and thermosetting resins is dissolved in a solvent such as NMP. Thus, a binder solution is provided.

If necessary, the binder solution may be mixed with a particulate insulator.

Subsequently, the binder solution is mixed with a pot mixer to provide slurry (first insulating layer paste). The obtained slurry is applied to the positive-electrode active-material layers 21b and/or the positive-electrode collector electrode 21a to form the first insulating layers 42 at desired positions, for example, as illustrated in FIG. 3.

Similarly, the slurry (first insulating layer paste) is applied to the negative-electrode active-material layers 31b and/or the negative-electrode collector electrode 31a to form the first insulating layers 42 at desired positions.

In the electric double layer capacitor 80, the first insulating layers 42 are formed on both of the positive electrode and the negative electrode. During lamination, the first insulating layer 42 of the positive electrode and the first insulating layer 42 of the negative electrode are integrated into a single first insulating layer 42. This integrated first insulating layer 42 is bonded to the positive electrode and the negative electrode.

However, this configuration is not a limitation. Alternatively, the first insulating layer 42 may be formed only on one of the positive electrode and the negative electrode; and this first insulating layer 42 formed only on one of the positive electrode and the negative electrode may be bonded to the positive electrode and the negative electrode.

In this way, a desired number of the positive electrodes and the negative electrodes having the first insulating layers 42 thereon are prepared for lamination.

If necessary, the positive electrodes and the negative electrodes thus prepared may be adjusted in terms of shape or the like. For example, the electrodes may be subjected to processing such as blanking with a Thomson die so as to have a desired shape.

Figure 7:
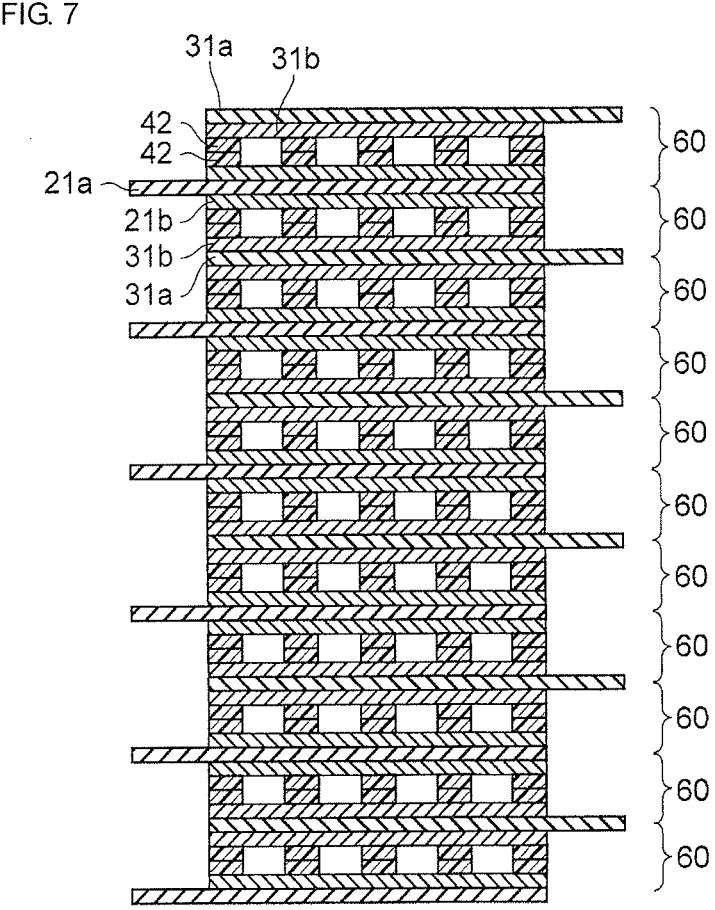
FIG. 7 is a sectional view of a laminated body formed by laminating electric storage units 60.

As illustrated in FIG. 7, the positive electrodes and the negative electrodes are laminated. After that, the above-described compression bonding such as thermocompression bonding is performed to bond the first insulating layers 42 to the positive electrodes and the negative electrodes. Thus, a laminated body in which electric storage units 60 are laminated is formed.

The lead portions of the positive-electrode collector electrodes 21a of the laminated body are collectively welded (for example, ultrasonic welding). Thus, the welded portion 22a is formed to connect together the positive-electrode collector electrodes 21a; and the welded portion 22a is welded to the positive-electrode tab 23a. As a result, the positive-electrode tab 23a can be electrically connected to the positive-electrode collector electrodes 21a.

Similarly, the lead portions of the negative-electrode collector electrodes 31a of the laminated body are collectively welded (for example, ultrasonic welding). Thus, the welded portion 32a is formed to connect together the negative-electrode collector electrodes 31a; and the welded portion 32a is welded to the negative-electrode tab 33a. As a result, the negative-electrode tab 33a can be electrically connected to the negative-electrode collector electrodes 31a.

The laminated body is wrapped with a film such as an aluminum laminate film. For example, an impulse sealer is used to heat polypropylene layers formed on the inner surfaces of the film. Thus, the polypropylene layers are heat-bonded together to preliminarily seal the film. As a result, the package 11 is formed. After that, the electrolyte 18 is supplied into the package 11. A sealing portion including a final sealing portion is completely sealed with a vacuum sealer or the like. Thus, the electric double layer capacitor 80 is obtained.

2. Second Embodiment (1) Electric Storage Device

Figure 8:
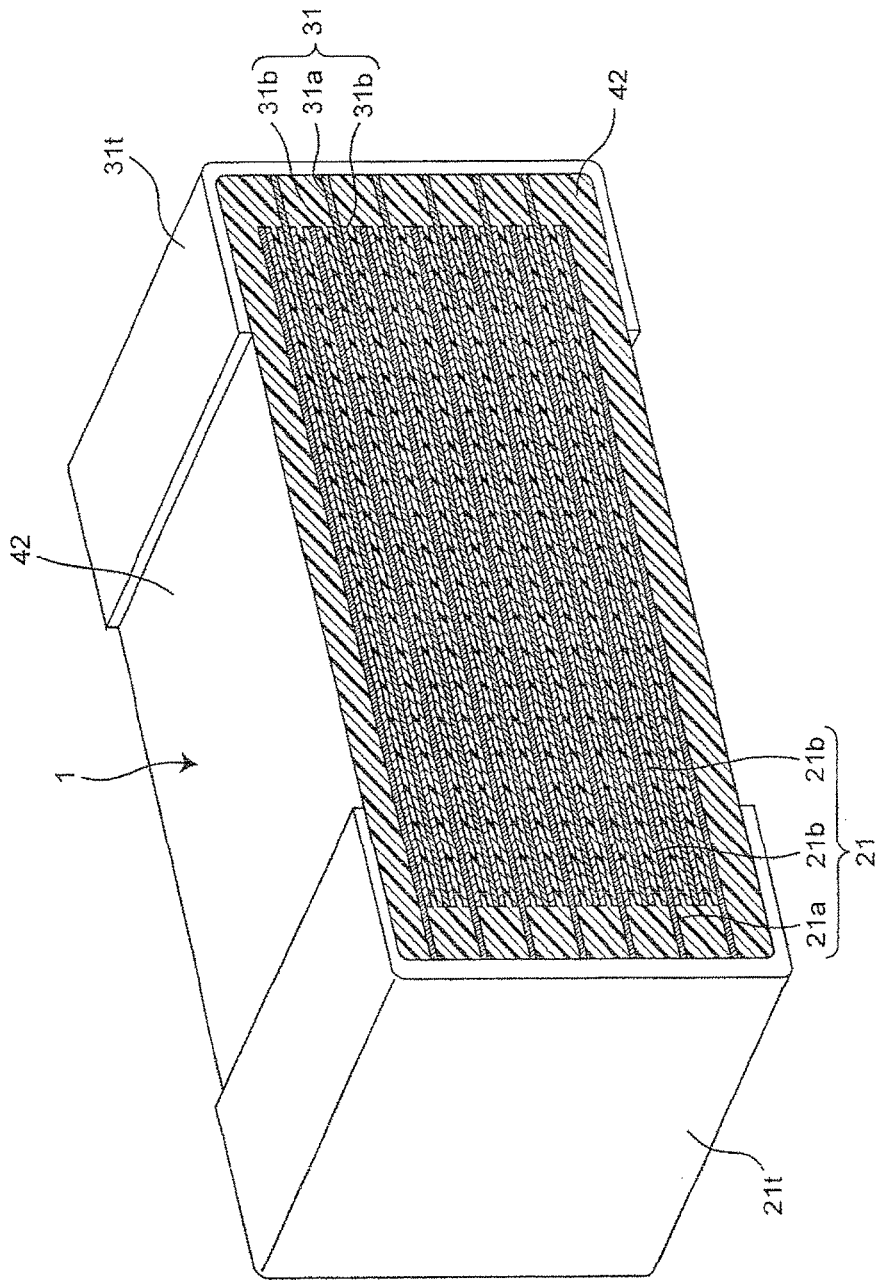
FIG. 8 is a partly sectioned perspective view of an electrochemical device according to a second embodiment in which a positive-electrode terminal electrode 21t and a negative-electrode terminal electrode 31t are formed in an electrochemical-device laminate block 1.

FIG. 8 is a perspective view of an electrochemical-device laminate block 1 used for an electric storage device according to a second embodiment.

Figure 16:
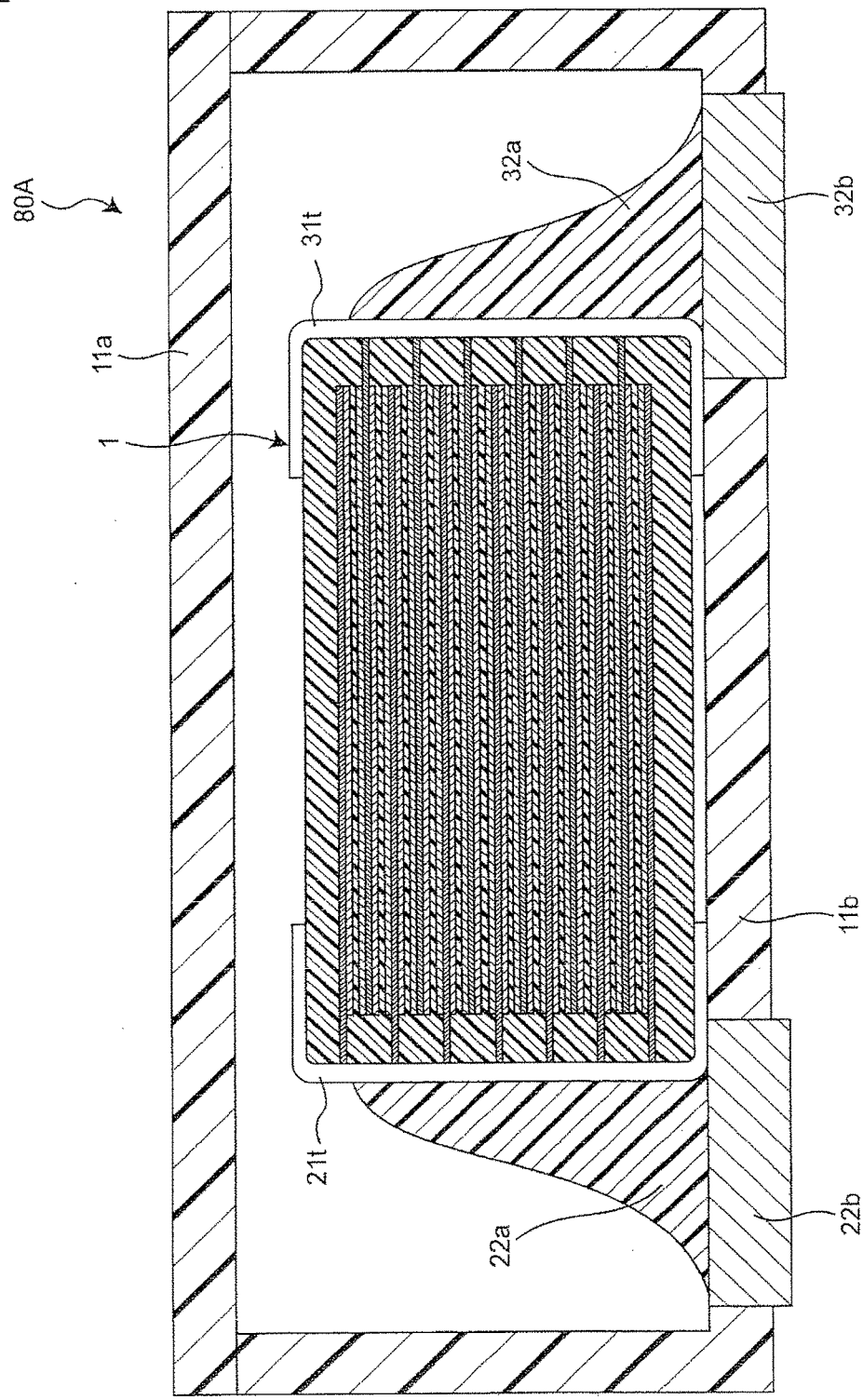
FIG. 16 is a sectional view of an electric double layer capacitor 80A serving as an example of an electric storage device including an electrochemical-device laminate block 1.

FIG. 16 is a sectional view of an electric double layer capacitor 80A serving as an example of an electric storage device including the electrochemical-device laminate block 1.

In FIG. 8, the front surface (hatched surface) of the electrochemical-device laminate block 1 illustrated is a cross section thereof for the purpose of understanding the schematic configuration of positive electrodes 21 (positive-electrode collector electrodes 21a and positive-electrode active-material layers 21b) and negative electrodes 31 (negative-electrode collector electrodes 31a and negative-electrode active-material layers 31b). Actually, as described later in detail in terms of a production method, the front surface is covered by the first insulating layer 42. An electrolyte is supplied through the first insulating layer 42 into electric storage units in the electrochemical-device laminate block 1. Similarly, the back surface (surface that is parallel to the front surface) of the electrochemical-device laminate block 1 is also covered by the first insulating layer 42 (not shown). The electrolyte can also permeate through this first insulating layer 42 covering the back surface.

The elements denoted by the same reference signs as in the first embodiment may be formed of the same materials as in the first embodiment unless otherwise specified.

As described later, by placing the electrochemical-device laminate block 1 together with an electrolyte within a package equipped with a positive-electrode package electrode and a negative-electrode package electrode, an electric storage device such as an electric double layer capacitor, a lithium-ion secondary battery, or a lithium-ion capacitor can be formed.

The electrochemical-device laminate block 1 is the same as the electric double layer capacitor 80 according to the first embodiment in terms of the following points. The electrochemical-device laminate block 1 includes a laminated body in which plural electric storage units are laminated. Each electric storage unit includes a pair of the positive electrode 21 (positive-electrode collector electrode 21a and positive-electrode active-material layer 21b) and the negative electrode 31 (negative-electrode collector electrode 31a and negative-electrode active-material layer 31b) in which the positive-electrode active-material layer 21b and the negative-electrode active-material layer 31b face each other, and the first insulating layer 42 (detailed illustration thereof is abbreviated in FIG. 8) that is disposed between the positive electrode and the negative electrode and is bonded to a portion of a surface of the positive electrode and a portion of a surface of the negative electrode. The electrochemical-device laminate block 1 also includes, within each electric storage unit, an electrolyte (not shown in FIG. 8) between the positive-electrode active-material layer 21b and the negative-electrode active-material layer 31b.

In addition, as in the first embodiment, the first insulating layer 42 preferably has an air permeability P that satisfies the formula (1).

Accordingly, the first insulating layer 42 has sufficiently high solution permeability for the electrolyte 18. Thus, when the electrochemical-device laminate block 1 is placed within a package and the electrolyte is supplied into the package, the electrolyte can be easily supplied into the electric storage units.

As a result, problems such as alteration and evaporation of the electrolyte caused by, for example, heat applied during lamination of electric storage units can be prevented.

In addition, the electrolyte may be supplied after formation of the laminated body. Accordingly, the necessity of handling electric storage units containing electrolyte during lamination of the electric storage units has been eliminated. Thus, the process is simplified and efficient.

However, in the production of an electric storage device including the electrochemical-device laminate block 1, supply of the electrolyte to the electrochemical-device laminate block 1 is not limited to after lamination of electric storage units. The electrolyte may be supplied prior to lamination of electric storage units and/or during lamination of the electric storage units, and may be additionally supplied after lamination of the electric storage units.

As described below in detail in terms of a method for producing the electrochemical-device laminate block 1, the electrochemical-device laminate block 1 includes the second insulating layers 14. However, the second insulating layers 14 may be abbreviated. Absence of the second insulating layers 14 facilitates a decrease in the resistance.

When the separator layers (second insulating layers) 14 are formed, the second insulating layers 14 have a lower air permeability P than the first insulating layer 42, which is also the same as in the first embodiment.

Hereinafter, referring to FIG. 16, the electric double layer capacitor 80A including the electrochemical-device laminate block 1 will be described.

The electrochemical-device laminate block 1 is placed within a package including a package base part 11b and a package lid part 11a. The package base part 11b and the package lid part 11a may be formed of a heat-resistant resin such as a liquid crystal polymer.

In the package base part 11b, a positive-electrode package electrode 22b and a negative-electrode package electrode 32b that are formed of a metal such as aluminum are disposed so as to be separated from each other.

A positive-electrode terminal electrode 21t of the electrochemical-device laminate block 1 electrically connected to the positive-electrode collector electrodes 21a is electrically connected to the positive-electrode package electrode 22b with a conductive adhesive 22a. Similarly, a negative-electrode terminal electrode 31t of the electrochemical-device laminate block 1 electrically connected to the negative-electrode collector electrodes 31a is electrically connected to the negative-electrode package electrode 32b with a conductive adhesive 32a.

An electrolyte is placed within the package including the package base part 11b and the package lid part 11a.

When this electrolyte is supplied after placement of the electrochemical-device laminate block 1 within the package, as described above, the electrolyte permeates through the first insulating layer 42 and enters the electric storage units.

(2) Production Method

Figure 9:
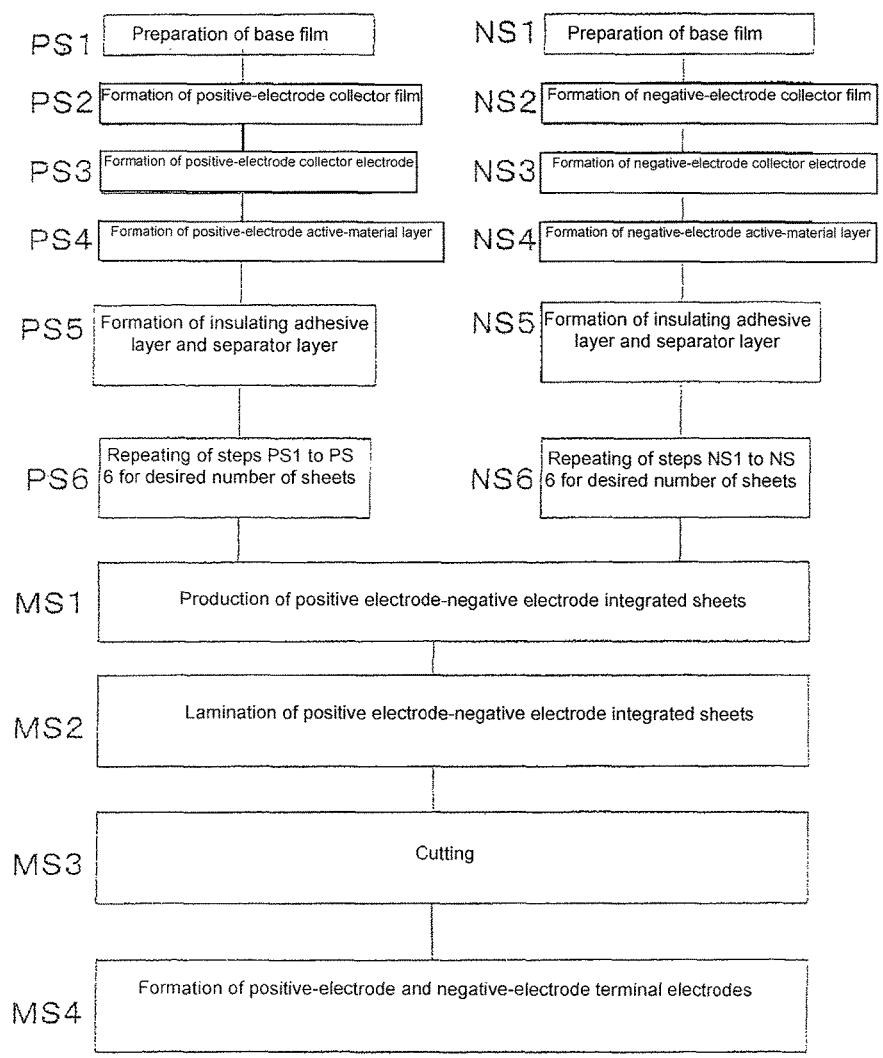
FIG. 9 is a step flow chart of a method for producing an electric storage device according to a second embodiment of the present invention.

FIG. 9 is a step flow chart of a method for producing an electric storage device (electrochemical-device laminate block 1) according to the second embodiment of the present invention. Hereinafter, the steps will be described on the basis of the step flow in FIG. 9.

i) Production of Positive-Electrode Composite Sheet 20A
<Step PS1>

Figure 10:
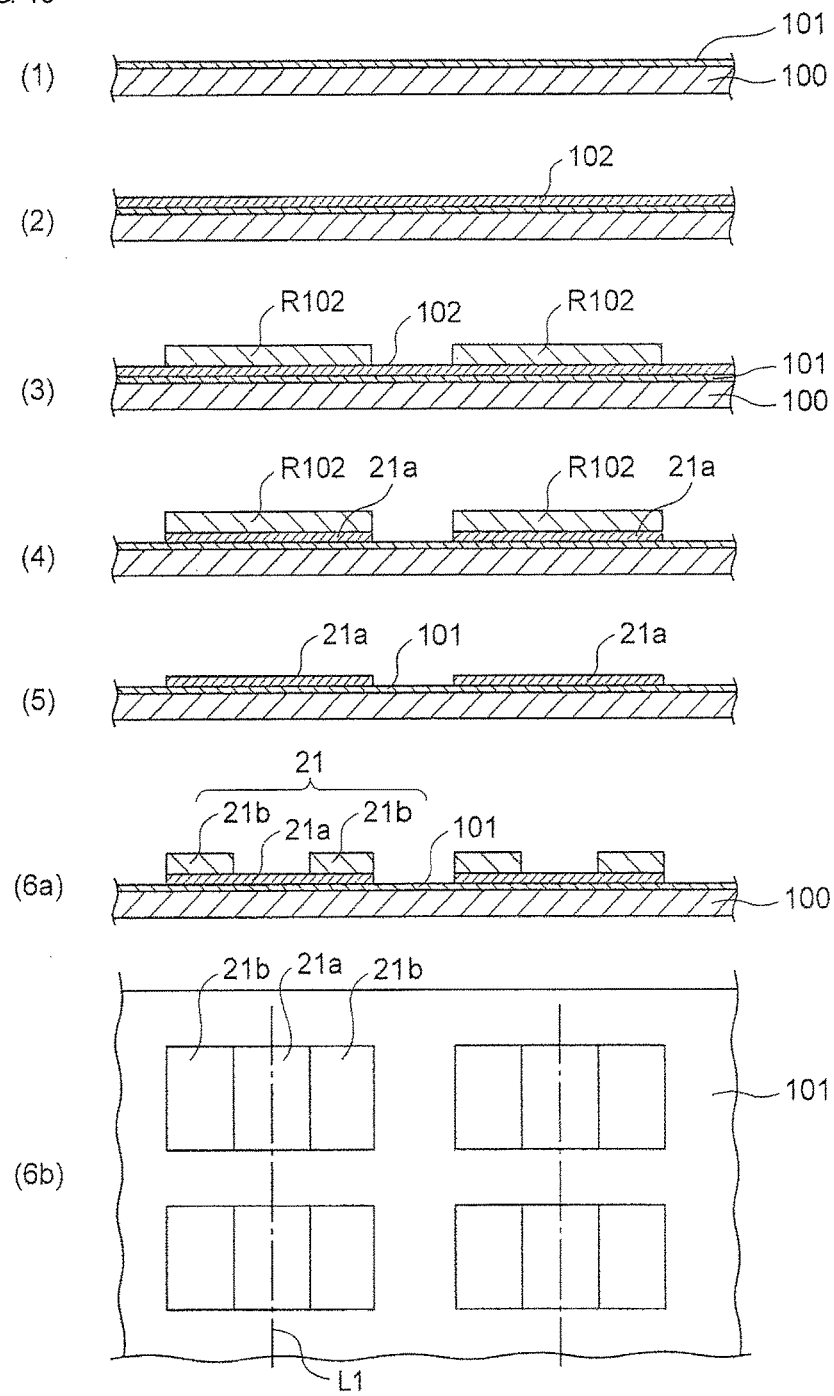
FIG. 10 illustrates, in a method for producing an electric storage device according to a second embodiment, a step of forming a positive electrode 21 on a base film 100.

As illustrated in FIG. 10(1), a base film 100 is prepared. For example, the base film 100 is formed of polyethylene terephthalate and a silicone-based release layer 101 is formed on a surface of the base film 100.

When a base film itself has releasability, the base film can be used without being treated so as to have releasability.

When a base film does not have releasability or when the releasability of a base film is intended to be enhanced, the base film is preferably treated so as to have releasability, for example, by formation of the release layer 101.

The base film 100 may be, for example, a plastic film formed of, for example, polypropylene, polyester, polycarbonate, polyamide, polyamide-imide, polyethylene, a fluorocarbon resin, or cellulose acetate; a cellophane, or a paper film.

A base film can be treated so as to have releasability by, for example, coating the base film with a silicone resin, a wax, a surfactant, a metal oxide, a fluorocarbon resin, or the like.

Another release layer 101 may be appropriately used that is mainly formed of one or more resins such as nitrocellulose, rigid polyvinyl chloride, polyamide, polyester, melamine resins, urea resins, epoxy resins, and urethane resins. Such resins are used to impart releasability to a base film by, for example, coating the base film with the resins by a gravure process. Thus, the release layer 101 is formed.

<Step PS2>

Subsequently, as illustrated in FIG. 10(2), a positive-electrode collector film 102 is formed on the base film 100 by, for example, vapor deposition.

When the positive-electrode collector film 102 is thus formed on a smooth surface of the base film 100, the positive-electrode collector film 102 having high continuity, a small thickness, and a low resistance is easily obtained. As a result, reduction in the size and profile of the electric storage device can be effectively achieved.

The positive-electrode collector film 102 can be formed by, other than vapor deposition, a publicly known technique such as sputtering or coating. When vapor deposition or sputtering is employed, the resultant film has high continuity and hence a collector film having a low resistance and a small thickness is easily formed. Thus, reduction in the size and profile of the electric storage device can be easily achieved.

<Step PS3>

As illustrated in FIG. 10(3), plural resist patterns R102 are printed at predetermined intervals on the positive-electrode collector film 102, and dried. The resist patterns R102 are arranged in, for example, a matrix and are each formed so as to have a rectangular shape similar to that of each positive-electrode collector electrode 21a.

Subsequently, as illustrated in FIG. 10(4), the positive-electrode collector film 102 is etched through the resist patterns R102 serving as an etching mask. As illustrated in FIG. 10(5), the resist patterns R102 are stripped. In this way, the positive-electrode collector electrodes 21a having a rectangular shape are formed.

Examples of the masking process include, in addition to a screen-printing process using resist, a gravure-printing process using resist, photolithography using coating-type resist, and photolithography using dry film resist. When low cost is emphasized, screen printing and gravure printing are preferred. When accuracy is emphasized, photolithographies are preferred.

Examples of the process of forming collector electrodes include, in addition to the process of etching a collector film, a process of directly depositing a collector film through a metal mask onto a base film having a release layer; and a process of directly depositing a collector film through an oil mask onto a base film having a release layer and performing a plasma ashing treatment.

When oxide films are generated in the surfaces of the positive-electrode collector electrodes 21a, after the formation of the positive-electrode collector electrodes 21a, a step of removing the oxide films of the positive-electrode collector electrodes 21a is preferably performed. The removal of oxide films of the positive-electrode collector electrodes 21a may be performed in the following manner. For example, when the positive-electrode collector electrodes 21a are formed of aluminum (Al), they are passed through an acid mixture of hydrofluoric acid and sulfuric acid to remove oxide films in the aluminum surfaces.

<Step PS4>

As illustrated in FIGS. 10(6a) and 10(6b), the positive-electrode active-material layers 21b are formed at two positions on each positive-electrode collector electrode 21a.

The positive-electrode active-material layers 21b can be formed on the positive-electrode collector electrodes 21a by, for example, performing screen-printing with active-material slurry. For example, the positive-electrode active-material layers 21b are symmetrically formed with respect to a center line L1, which is orthogonal to the longitudinal direction of each positive-electrode collector electrode 21a, at a predetermined distance from the center line L1.

The side surfaces of the positive-electrode active-material layers 21b (except for inner side surfaces facing each other with the center line L1 therebetween) are preferably formed so as to conform to the periphery of the positive-electrode collector electrode 21a.

<Step PS5>

Figure 11:
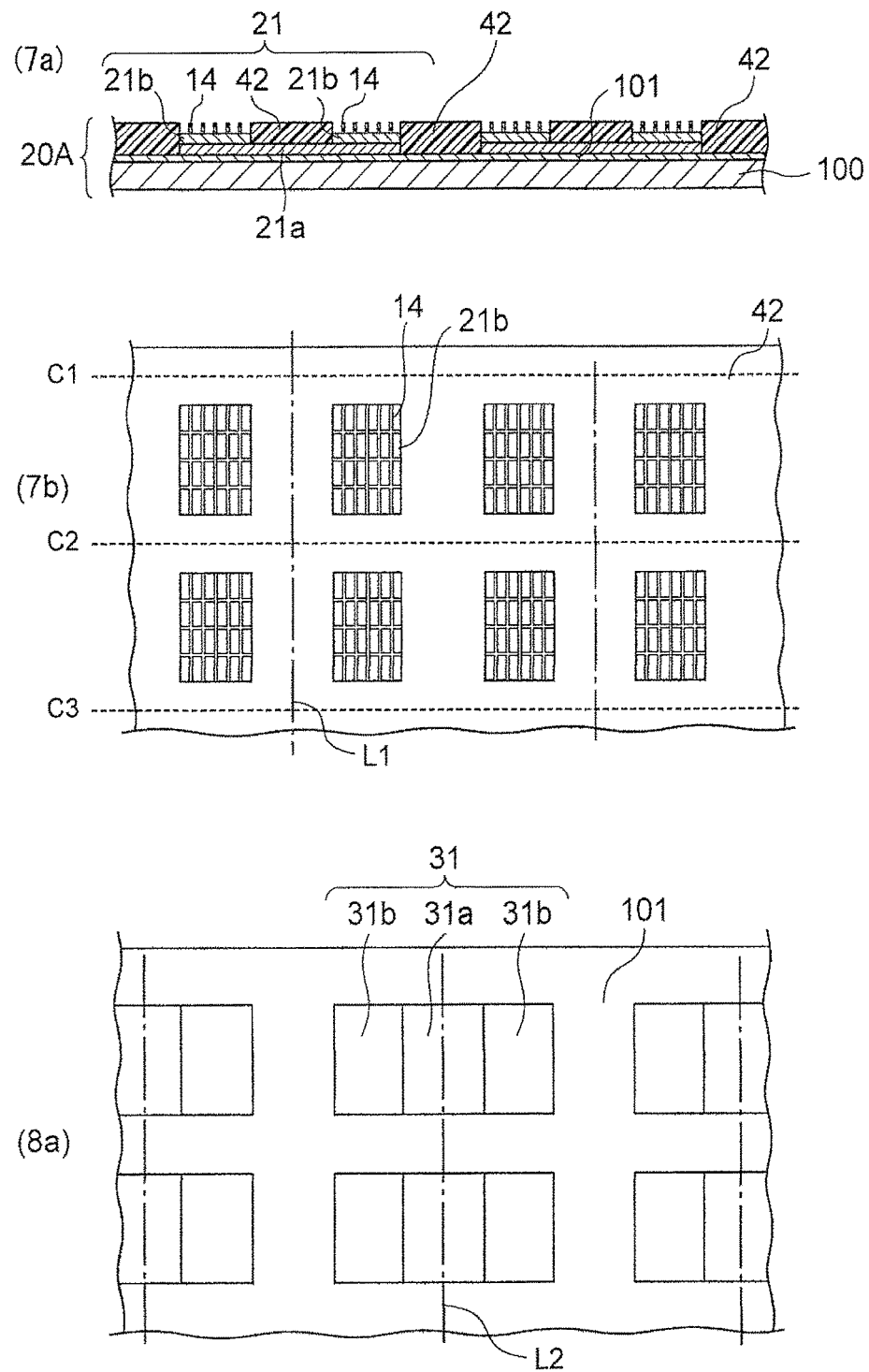
FIG. 11 illustrates, in a method for producing an electric storage device according to a second embodiment, a step of forming a first insulating layer 42 on a positive electrode 21 to produce a positive-electrode composite sheet 20A and a step of forming a negative-electrode collector electrode 31a and a negative-electrode active-material layer 31b.

As illustrated in FIGS. 11(7a) and 11(7b), the second insulating layers 14 are subsequently formed on the positive-electrode active-material layers 21b.

The second insulating layers 14 are disposed such that portions of the positive-electrode active-material layers 21b on which the second insulating layers 14 are not formed (portions where the positive-electrode active-material layers 21b are exposed) form a grid pattern.

In addition, the first insulating layer 42 is formed on the release layer 101 and the positive-electrode collector electrodes 21a so as to surround the positive-electrode active-material layers 21b.

As described above, the front surface (hatched surface in FIG. 8) of the electrochemical-device laminate block 1 is covered by the first insulating layer 42 (not shown in FIG. 8). Similarly, the back surface (surface that is parallel to the front surface) of the electrochemical-device laminate block 1 is also covered by the first insulating layer 42.

By a step MS3 described later, plural electric storage units (or intermediate products for providing electric storage units) arranged in the vertical direction in FIG. 11(7b) are divided in the vertical direction. At this time, the electric storage units are divided, for example, with respect to lines C1, C2, and C3 in FIG. 11(7b) and the front surfaces and back surfaces of the electrochemical-device laminate blocks 1 can be covered with the first insulating layers 42.

The first insulating layers 42 covering the front surface and back surface of the electrochemical-device laminate block 1 have solution permeability (air permeability) similar to that in the first embodiment. Accordingly, an electrolyte can permeate through the first insulating layers 42 and can enter the electric storage units of the electrochemical-device laminate block 1.

Needless to say, gas generated in the electric storage units of the electrochemical-device laminate block 1 can permeate through the first insulating layers 42 and can be discharged from the electrochemical-device laminate block 1.

By performing the above-described steps PS1 to PS5, a positive-electrode composite sheet 20A is produced.

<Step PS6>

In a step PS6, the steps PS1 to PS5 are repeated to produce a desired number of positive-electrode composite sheets 20A.

ii) Production of Negative-Electrode Composite Sheet 30A

As illustrated in FIG. 9, steps NS1 to NS6, which are similar to the steps PS1 to PS6 for producing the positive-electrode composite sheets 20A, are performed to produce negative-electrode composite sheets 30A.

In each negative-electrode composite sheet 30A, as illustrated in FIGS. 11(8a) and 12(8b), the negative-electrode collector electrodes 31a are arranged such that a center line L2, which is orthogonal to the longitudinal direction of each negative-electrode collector electrode 31a, is positioned in the center between the center lines L1 of the positive-electrode collector electrodes 21a in the positive-electrode composite sheet 20A. The negative-electrode active-material layers 31b are symmetrically formed with respect to the center line L2 so as to overlap the positive-electrode active-material layers 21b.

In the steps NS2 to NS4, instead of the positive-electrode collector film 102, the positive-electrode collector electrodes 21a, and the positive-electrode active-material layers 21b in the steps PS2 to PS4, a negative-electrode collector film, the negative-electrode collector electrodes 31a, and the negative-electrode active-material layers 31b are respectively formed. When an electric double layer capacitor is produced as the electric storage device, the positive-electrode collector film 102 and the negative-electrode collector film may be similar; the positive-electrode collector electrodes 21a and the negative-electrode collector electrodes 31a may be similar; and the positive-electrode active-material layers 21b and the negative-electrode active-material layers 31b may be similar.

The positive-electrode collector electrodes 21a and the negative-electrode collector electrodes 31a may be the same or different from each other in terms of shape and area. The positive-electrode active-material layers 21b and the negative-electrode active-material layers 31b may be the same or different from each other in terms of shape and area. In view of possible misalignment between the positive electrode 21 and the negative electrode 31, one of the positive electrode 21 and the negative electrode 31 may be formed so as to have a larger area than the other. Thus, even when misalignment occurs between the positive electrode 21 and the negative electrode 31, the area of one of the positive electrode 21 and the negative electrode 31 facing the other remains unchanged. Accordingly, changes in the resistance and capacitance of the electric double layer capacitor can be suppressed.

In this Description, when something that is common to both the positive electrode and the negative electrode is collectively referred to without referring to individual electrodes, the positive-electrode composite sheet 20A and the negative-electrode composite sheet 30A may be referred to as a composite sheet; the positive-electrode collector electrode 21a and the negative-electrode collector electrode 31a may be simply referred to as a collector electrode; and the positive-electrode active-material layer 21b and the negative-electrode active-material layer 31b may be simply referred to as an active-material layer.

In the second embodiment, an example in which a collector electrode is formed and an active-material layer is subsequently formed by application is described above. Alternatively, in the present invention, a composite sheet may be formed in the following manner: the first insulating layer and the second insulating layer are formed on the base film 100; an active-material layer is formed thereon; and a collector electrode is subsequently formed.

However, when an active-material layer is formed by application on a collector electrode as described in the second embodiment, a binder in the active-material layer deposits in a region near the interface between the active-material layer and the collector electrode. Accordingly, the bonding strength between the active-material layer and the collector electrode can be enhanced.

When an active-material layer is formed by application on a collector electrode having high continuity and a small thickness as described in the second embodiment, further reduction in the size and profile can be achieved.

When a collector electrode is formed on an active-material layer, etching for the collector electrode and removal of an oxide film on the collector electrode may be difficult to perform. In contrast, in the second embodiment, an active-material layer is formed on a collector electrode. Accordingly, the collector electrode can be formed by etching and, after removal of an oxide film on the collector electrode, the active-material layer can be formed; and these etching and removal of the oxide film are easily performed.

iii) Production and Lamination of Positive Electrode-Negative Electrode Integrated Sheets <Step MS1>

Figure 12:
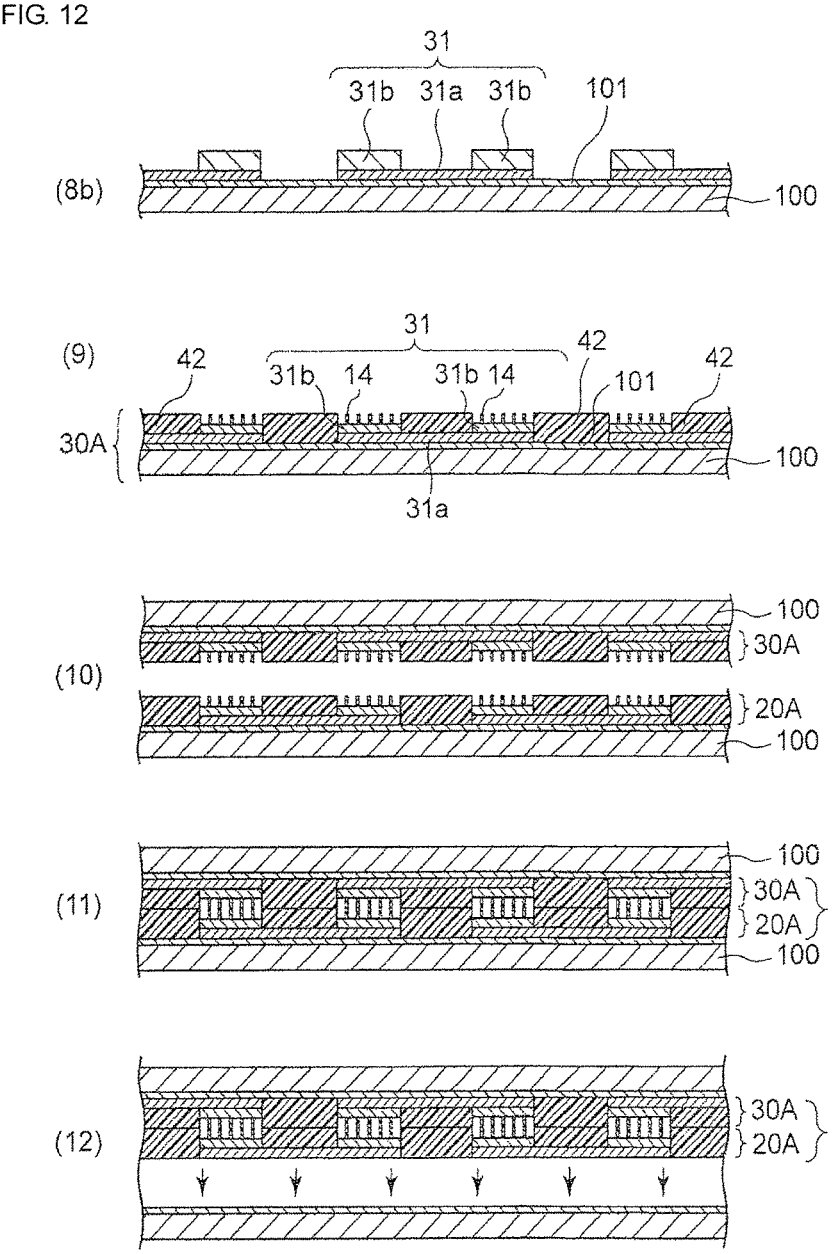
FIG. 12 illustrates, in a method for producing an electric storage device according to a second embodiment, a step of forming a positive electrode-negative electrode integrated sheet 50A.

As illustrated in FIG. 12(10), the positive-electrode composite sheet 20A and the negative-electrode composite sheet 30A are arranged such that surfaces having the first insulating layers 42 face each other. Both of the positive-electrode composite sheet 20A and the negative-electrode composite sheet 30A are uniformly pressed with, for example, pressure plates (not shown), under heating. As a result, as illustrated in FIG. 12(11), the first insulating layers 42 are bonded together. Thus, a positive electrode-negative electrode integrated sheet 50A is produced.

At this time, for example, the temperature of the pressure plates is set to be 150° C.; the pressure applied is set to be 20 MPa; and the time for applying the pressure is set to be 30 seconds.

In the positive electrode-negative electrode integrated sheet 50A thus produced by bonding together the first insulating layers 42, the positive-electrode composite sheet 20A and the negative-electrode composite sheet 30A arranged with the bonding surface therebetween have substantially the same thermal expansion-contraction characteristics. Accordingly, the occurrence of warpage after the bonding is suppressed and the integrated sheet is easily handled in the subsequent production steps.

The positive-electrode composite sheet 20A and the negative-electrode composite sheet 30A are bonded together to provide the positive electrode-negative electrode integrated sheet 50A. Accordingly, even when the positive-electrode composite sheet 20A and the negative-electrode composite sheet 30A are formed so as to have a small thickness, handling of the positive-electrode composite sheet 20A and the negative-electrode composite sheet 30A without destruction thereof is facilitated while the regular arrangement and predetermined alignment are maintained. Thus, further reduction in the size and profile of devices can be achieved.

In the positive electrode-negative electrode integrated sheet 50A, plural electric storage units are formed so as to be arranged in the lateral direction. In such an electric storage unit, the second insulating layers 14 are disposed between the positive-electrode active-material layer 21b and the negative-electrode active-material layer 31b so as to be bonded to a portion of the surface of the positive-electrode active-material layer 21b and a portion of the surface of the negative-electrode active-material layer 31b. As a result, a short circuit caused by contact between the positive-electrode active-material layer 21b and the negative-electrode active-material layer 31b is suppressed. In addition, since the second insulating layers 14 are bonded to only a portion of the surface of the positive-electrode active-material layer 21b and a portion of the surface of the negative-electrode active-material layer 31b, cavities are formed between the positive-electrode active-material layer 21b and the negative-electrode active-material layer 31b. The second insulating layers 14 and the cavities can hold an electrolyte therein.

The first insulating layer 42 has solution permeability (air permeability). Accordingly, the following deformation of the positive electrode-negative electrode integrated sheet 50A can be suppressed: during production of the positive electrode-negative electrode integrated sheet 50A by bonding together the positive-electrode composite sheet 20A and the negative-electrode composite sheet 30A, gas (the air or the like) is excessively contained between the positive-electrode composite sheet 20A and the negative-electrode composite sheet 30A to thereby expand and deform the positive electrode-negative electrode integrated sheet 50A.

After the first insulating layers are bonded together, one of the base films 100 of the negative-electrode composite sheet 30A and the positive-electrode composite sheet 20A is separated.

For example, the base film 100 on the positive-electrode side is separated in the following manner. As illustrated in FIG. 12(12), while the negative-electrode side of the positive electrode-negative electrode integrated sheet 50A is brought into contact with a vacuum chuck (not shown) and suctioned, the positive electrode-negative electrode integrated sheet 50A is lifted to separate the base film 100 on the positive-electrode side.

In order to separate the base film 100 on the positive-electrode side, the bonding strength between the positive-electrode composite sheet 20A and the negative-electrode composite sheet 30A needs to be higher than the bonding strength between the base film 100 and the positive-electrode composite sheet 20A. This bonding-strength difference can be relatively easily achieved by the presence of a release layer between the base film 100 and the positive-electrode composite sheet 20A.

On the other hand, when such a release layer is absent between the base film 100 and the positive-electrode composite sheet 20A, the above-described bonding-strength difference can be achieved by, for example, bonding together the positive-electrode composite sheet 20A and the negative-electrode composite sheet 30A at a high temperature and a high pressure. However, such bonding at a high temperature and a high pressure should be performed not to eliminate cavities between the active-material layers and pores in the second insulating layers and not to deform the positive-electrode composite sheet 20A and the negative-electrode composite sheet 30A.

For example, when a collector electrode is formed on a base film by vapor deposition, the base film may be thermally damaged or deposition particles may get into the base film due to their kinetic energy. As a result, the collector electrode is strongly bonded to the base film and may be difficult to separate from the base film without the presence of a release layer. Accordingly, in the present invention, a release layer is preferably formed so as to have such a large thickness that can suppress damage to the base film.

In the case where the base film 100 on the negative-electrode side is separated, while the positive-electrode side of the positive electrode-negative electrode integrated sheet 50A is brought into contact with a vacuum chuck and suctioned, the positive electrode-negative electrode integrated sheet 50A is lifted to separate the base film 100 on the negative-electrode side.

In this way, a desired number of the positive electrode-negative electrode integrated sheets 50A each having the base film 100 bonded to one of the positive-electrode composite sheet 20A and the negative-electrode composite sheet 30A are produced.

iv) Lamination of Positive Electrode-Negative Electrode Integrated Sheets

<Step MS2>

Figure 13:
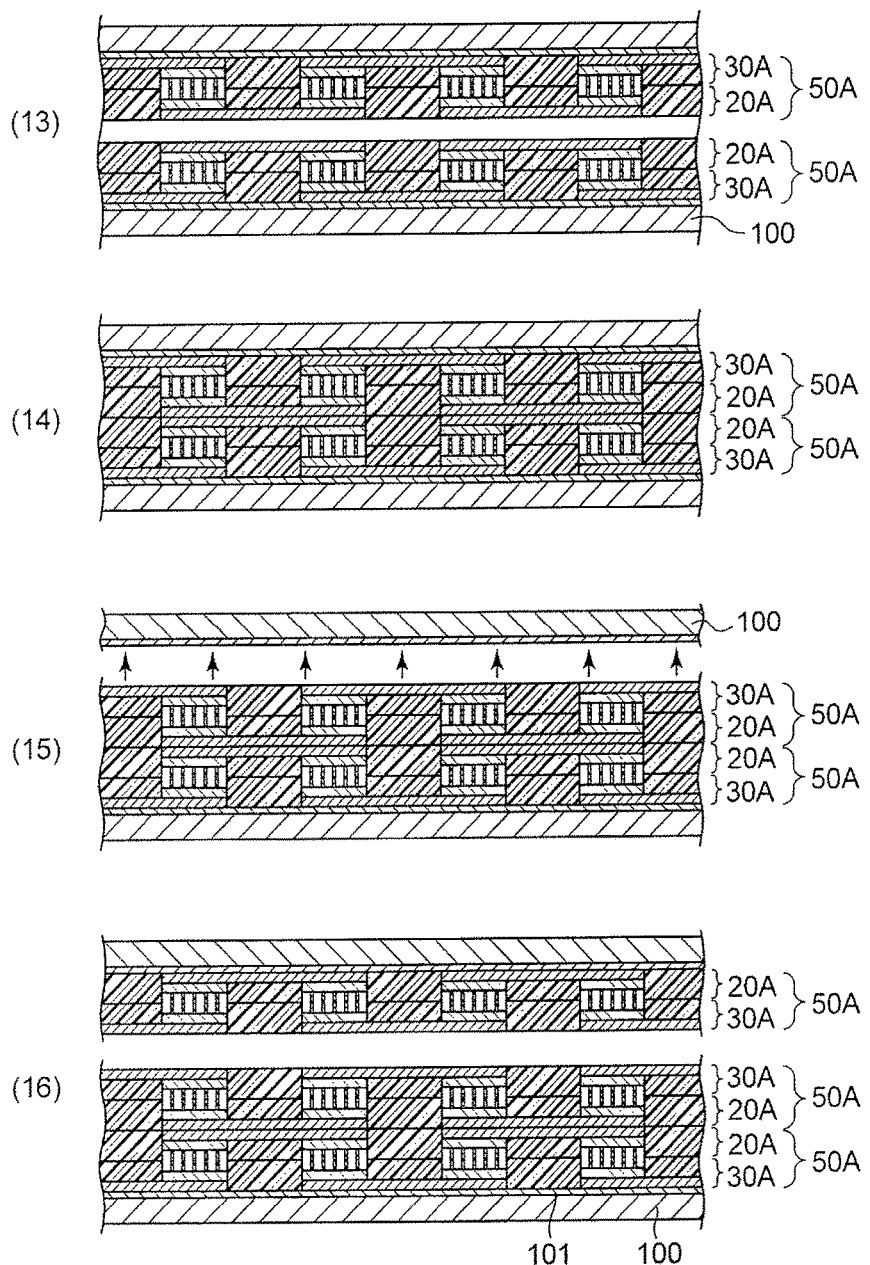
FIG. 13 illustrates, in a method for producing an electric storage device according to a second embodiment, a step of laminating positive electrode-negative electrode integrated sheets.

The first lamination is performed, for example, in the following manner. As illustrated in FIG. 13(13), under a positive electrode-negative electrode integrated sheet 50A the negative-electrode side of which is suctioned with a vacuum chuck, another positive electrode-negative electrode integrated sheet 50A having the base film 100 bonded to the negative-electrode composite sheet 30A is placed such that the base film 100 faces downward. As illustrated in FIG. 13(14), these two positive electrode-negative electrode integrated sheets 50A are then brought into contact with each other and bonded together by uniformly pressing the entire surface with a pressure plate (not shown).

At this time, for example, the temperature of the pressure plate is set to be 150° C.; the pressure applied is set to be 20 MPa; and the time for applying the pressure is set to be 30 seconds.

As illustrated in FIG. 8, when the electrochemical-device laminate block 1 having insulating layers as the uppermost and lowermost layers is produced, for example, an insulating layer sheet in which an insulating layer having a predetermined thickness (for example, 6 μm) alone is formed on the base film is used; and the first lamination is performed such that the positive electrode-negative electrode integrated sheet 50A is laminated with the insulating layer of the insulating layer sheet.

As illustrated in FIG. 13(15), the negative-electrode-side base film 100 of the positive electrode-negative electrode integrated sheet 50A suctioned with the vacuum chuck is subsequently separated.

Figure 14:
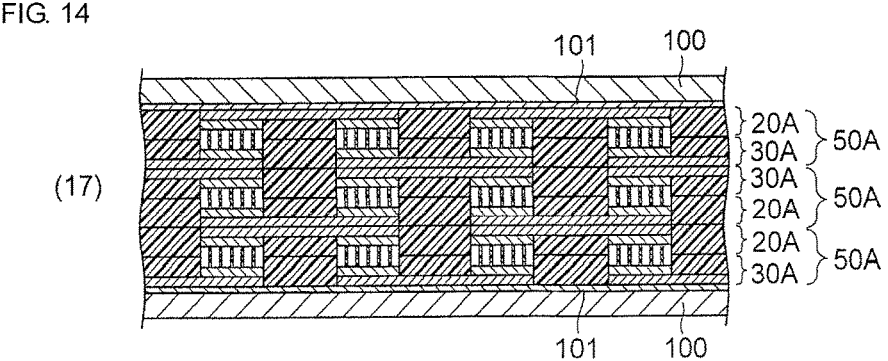
FIG. 14(17) is, in a method for producing an electric storage device according to a second embodiment, a sectional view illustrating lamination of laminated positive electrode-negative electrode integrated sheets 50A and another positive electrode-negative electrode integrated sheet 50A.

As illustrated in FIG. 13(16), on the positive electrode-negative electrode integrated sheet 50A from which the negative-electrode-side base film 100 has been separated, another positive electrode-negative electrode integrated sheet 50A from which the negative-electrode-side base film 100 has been separated is placed such that the negative-electrode sides face each other. As illustrated in FIG. 14(17), the negative-electrode sides are bonded together.

Subsequently, the positive-electrode-side base film 100 of the thus-laminated other positive electrode-negative electrode integrated sheet 50A is separated. On this positive electrode-negative electrode integrated sheet 50A, another positive electrode-negative electrode integrated sheet 50A from which the positive-electrode-side base film 100 has been separated is placed such that the positive-electrode sides face each other and the positive-electrode sides are bonded together.

After that, the steps MS1 and MS2 are repeated desired times. As a result, as illustrated in FIG. 15, an electrochemical-device laminate sheet LB1 in which the positive electrode-negative electrode integrated sheets 50A are laminated is produced.

As illustrated in FIG. 8, when the electrochemical-device laminate block 1 having insulating layers as the outermost layers is produced, as in the first lamination, the insulating layer sheet in which an insulating layer alone is formed is used; and the last lamination is performed by bonding the insulating layer sheet such that the insulating layer thereof faces the laminated sheets.

Figure 15:
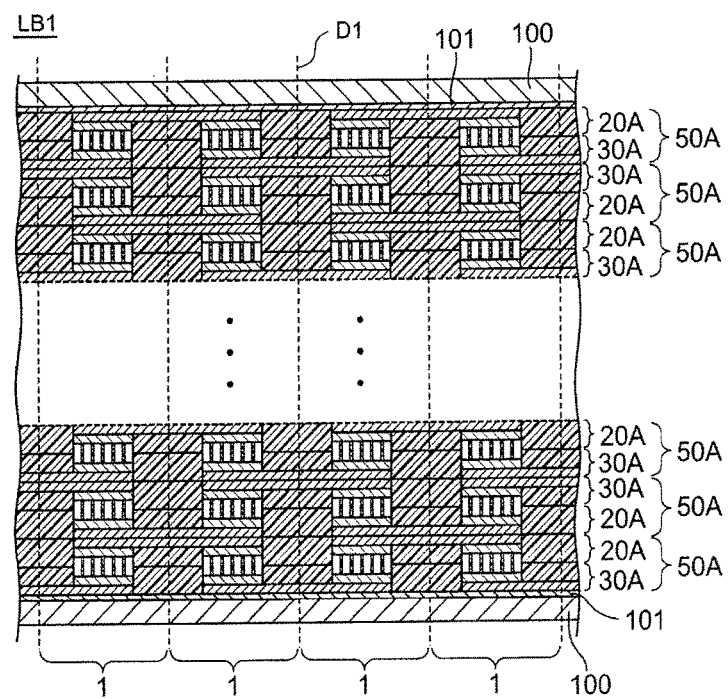
FIG. 15 is a sectional view of an electrochemical-device laminate sheet LB1 in which positive electrode-negative electrode integrated sheets 50A according to a second embodiment are laminated.

As illustrated in FIG. 15, in the electrochemical-device laminate block 1 produced by the above-described steps, the positive-electrode collector electrode 21a and the negative-electrode collector electrode 31a in the outermost layers are each a single layer and are thinner than inner collector electrodes each of which includes two layers of the positive-electrode collector electrodes 21a or the negative-electrode collector electrodes 31a. However, in FIG. 8, due to constraints of drawing, all the positive-electrode collector electrodes and the negative-electrode collector electrodes are illustrated so as to have the same thickness.

However, in the present invention, for example, collector electrodes or active-material layers may be formed so as to have the same thickness irrespective of their positions, or may be appropriately formed so as to have different thicknesses in accordance with their positions or production methods.

In the second embodiment, the positive-electrode collector electrode 21a or the negative-electrode collector electrode 31a is directly formed on the release layer 101 on a surface of the base film 100. Alternatively, another configuration may be employed: for example, an adhesive layer formed of a urethane resin is formed on the release layer 101 on a surface of the base film 100; and, on this adhesive layer, the positive-electrode collector electrode or the negative-electrode collector electrode is formed.

In this case, for example, during bonding together of the positive electrode-negative electrode integrated sheets 50A in FIG. 13(14), the adhesive layer is separated from the base film 100 and transferred to the positive electrode-negative electrode integrated sheet 50A. The positive-electrode collector electrodes or the negative-electrode collector electrodes are bonded together with more certainty with the transferred adhesive layer therebetween. Accordingly, an electric storage device having higher reliability can be produced.

<Step MS3>

Subsequently, the base films 100 disposed in the uppermost and lowermost layers of the electrochemical-device laminate sheet LB1 are separated. The electrochemical-device laminate sheet LB1 is then cut along cutting lines D1 to provide the electrochemical-device laminate blocks 1.

That is, electric storage units laminated in the vertical direction and arranged in the lateral direction are cut into individual laminated electric storage units to provide the electrochemical-device laminate blocks 1.

Alternatively, in this step, after the electrochemical-device laminate sheet LB1 is cut, the base films 100 may be separated.

<Step MS4>

As illustrated in FIG. 8, the positive-electrode terminal electrode 21t is formed on one of the cut surfaces of the electrochemical-device laminate block 1 provided by cutting, that is, a side surface in which the positive-electrode collector electrodes 21a are exposed; and the negative-electrode terminal electrode 31t is formed on the other, that is, a side surface in which the negative-electrode collector electrodes 31a are exposed.

The positive-electrode terminal electrode 21t and the negative-electrode terminal electrode 31t can be formed on side surfaces of the electrochemical-device laminate block 1 by, for example, deposition of aluminum by sputtering.

Other than sputtering, the positive-electrode terminal electrode 21t and the negative-electrode terminal electrode 31t may be formed by, for example, vapor deposition, ion plating, thermal spraying, cold spraying, or plating to directly form conductive films on side surfaces of the electrochemical-device laminate block 1.

Alternatively, the positive-electrode terminal electrode 21t and the negative-electrode terminal electrode 31t may be formed by dipping to directly coat side surfaces of the electrochemical-device laminate block 1 with a conductive adhesive.

For example, as illustrated in FIG. 16, the electrochemical-device laminate block 1 having, on side surfaces, the positive-electrode terminal electrode 21t and the negative-electrode terminal electrode 31t is contained, together with an electrolyte, within a package having the positive-electrode package electrode 22b and the negative-electrode package electrode 32b. Thus, an electric storage device such as the electric double layer capacitor 80A is produced.

When the electrochemical-device laminate block 1 is contained within the package, for example, the positive-electrode terminal electrode 21t and the negative-electrode terminal electrode 31t are coated with the conductive adhesives 22a and 32a containing conductive gold particles by dipping; and the electrochemical-device laminate block 1 is disposed such that the conductive adhesive 22a and the conductive adhesives 32a are respectively connected to the positive-electrode package electrode 22b and the negative-electrode package electrode 32b.

The package in which the electrochemical-device laminate block 1 is disposed is heated, for example, at 170° C. for 10 minutes to cure the conductive adhesives 22a and 32a. Thus, the electrochemical-device laminate block 1 is fixed on the package electrodes 22b and 32b; and the positive-electrode terminal electrode 21t and the negative-electrode terminal electrode 31t are electrically connected to the positive-electrode package electrode 22b and the negative-electrode package electrode 32b, respectively.

The material of the conductive particles is selected from gold, carbon, silver, copper, aluminum, and the like in accordance with the application.

As described above, in the electrochemical-device laminate block 1 within the package, the first insulating layer 42 has solution permeability (liquid permeability). Accordingly, an electrolyte is rapidly supplied between the positive-electrode active-material layer 21b and the negative-electrode active-material layer 31b in each electric storage unit.

The above-described method for producing the electrochemical-device laminate block 1 according to the second embodiment includes a step of producing the positive-electrode composite sheet 20A or the negative-electrode composite sheet 30A on the base film 100 and separating the positive-electrode composite sheet 20A or the negative-electrode composite sheet 30A from the base film 100.

As a result, plural positive-electrode collector electrodes 21a formed by patterning and the positive-electrode active-material layers 21b can be integrally formed on a single continuous first insulating layer.

Similarly, plural negative-electrode collector electrodes 31a formed by patterning and the negative-electrode active-material layer 31b can be integrally formed on a single continuous first insulating layer.

Accordingly, in the production method according to the second embodiment, a large number of the electrochemical-device laminate blocks 1 can be collectively produced. Thus, the productivity can be enhanced, compared with existing methods in which individual electric double layer capacitors are handled one by one.

In the above-described production method according to the second embodiment, since plural positive-electrode collector electrodes 21a or plural negative-electrode collector electrodes 31a formed by patterning are integrated with a single continuous first insulating layer 42, handling of the electrodes is facilitated. In addition, the positive-electrode composite sheet 20A and the negative-electrode composite sheet 30A are supported by the base films 100 until lamination thereof and hence handling of the electrodes is further facilitated.

Accordingly, for example, even when the thickness of the positive-electrode collector electrodes 21a or the negative-electrode collector electrodes 31a is reduced, the electrodes are easily handled. Thus, the electrochemical-device laminate block 1 having a smaller size can be produced.

In the production method according to the second embodiment, plural positive-electrode collector electrodes 21a and/or plural negative-electrode collector electrodes 31a formed by patterning and plural positive-electrode active-material layers 21b and/or plural negative-electrode active-material layers 31b are integrated with the first insulating layer 42. Accordingly, even when the size of the electrochemical-device laminate block 1 is reduced, handling in the production process is facilitated and the electrochemical-device laminate block 1 having a smaller size can be produced.

In the above-described production method according to the second embodiment, the positive electrode 21 and the negative electrode 31 adjacent to each other are fixed by being bonded to the first insulating layer 42. Accordingly, the occurrence of misalignment between the positive electrode 21 and the negative electrode 31 during production process and after production can be suppressed.

As a result, handling of sheets and lamination of the sheets during production process are facilitated; and, after production, changes in characteristics such as a change in the capacitance can be suppressed.

In the above-described production method according to the second embodiment, collector electrodes each having an active-material layer on one of the surfaces are arranged such that the other surfaces face each other. Accordingly, a configuration in which active-material layers are formed on both surfaces of a collector electrode can be easily achieved. Thus, the electrochemical-device laminate block 1 having a high volume-capacitance ratio can be produced.

When existing production methods are used, it is difficult to form active-material layers on both surfaces of a collector foil because of difficulties in handling.

In the embodiment, the first insulating layers 42 of the positive-electrode composite sheet 20A and the negative-electrode composite sheet 30A are bonded together to produce the positive electrode-negative electrode integrated sheet 50A; and such positive electrode-negative electrode integrated sheets 50A are laminated to produce the electrochemical-device laminate sheet LB1. However, the method for producing an electrochemical-device laminate sheet is not limited to this method. Alternatively, the following production method may be employed.

For example, two positive-electrode composite sheets 20A from which the base films 100 have been separated are prepared; the surfaces from which the base films have been separated are bonded together such that the positive-electrode collector electrodes 21a face each other. Thus, a positive electrode-positive electrode integrated sheet is produced. Similarly, two negative-electrode composite sheets 30A from which the base films 100 have been separated are prepared; the surfaces from which the base films have been separated are bonded together such that the negative-electrode collector electrodes 31a face each other. Thus, a negative electrode-negative electrode integrated sheet is produced. The positive electrode-positive electrode integrated sheet and the negative electrode-negative electrode integrated sheet are bonded together such that the first insulating layers 42 thereof face each other. Thus, a laminate sheet is produced. The positive electrode-positive electrode integrated sheet of this laminate sheet is bonded to another negative electrode-negative electrode integrated sheet such that the first insulating layers 42 face each other. This lamination step is repeated desired times to produce an electrochemical-device laminate sheet.

The electrochemical-device laminate block 1 and the electric double layer capacitor 80A according to the embodiment are not limited to the configurations in which electric storage units are laminated as illustrated in FIGS. 8 and 16. For example, the electrochemical-device laminate block 1 and the electric double layer capacitor 80A in which electric storage units are not laminated are also encompassed within the present invention.

These electrochemical-device laminate block 1 and electric double layer capacitor 80A can be obtained by, for example, using a single positive electrode-negative electrode integrated sheet 50A alone without lamination thereof.

EXAMPLES

1. Example 1

(1) Method for Producing Active Carbon Electrode (i) active carbon (BET specific surface area: 1668 $m^2/g$; average pore diameter: 1.83 nm; median particle diameter D50=1.26 µm) 29.0 g, (ii) carbon black (TOKABLACK (registered trademark) #3855, manufactured by TOKAI CARBON CO., LTD., BET specific surface area: 90 $m^2/g$) 2.7 g, (iii) carboxymethylcellulose (CMC2260, manufactured by DAICEL CHEMICAL INDUSTRIES, LTD.) 3.0 g, (iv) 38.8 wt % aqueous solution of polyacrylate resin 2.0 g, and (v) deionized water 286 g were weighed and mixed by primary dispersion and secondary dispersion under conditions in Table 1 to produce active carbon paste.

As illustrated in FIG. 6(a), one of the surfaces of an aluminum foil (collector) having a thickness of 20 µm was coated with the active carbon paste by screen printing. Thus, the active-material layer 21b (or 31b) having a thickness of 5 µm (active carbon electrode) was formed.

The shape of the formed active-material layer in plan view was a 10 mm×10 mm square.

TABLE 1

| | |
|---|---|
| Primary dispersion | Equipment: DESPA MILL [MD-3, manufactured by ASADA IRON WORKS. CO., LTD.]<br>Conditions: Volume of 1 L; Number of revolutions of 6000 rpm; Dispersion time for 120 min |
| Secondary dispersion | Equipment: DESPA MILL [MD-3, manufactured by ASADA IRON WORKS. CO., LTD.]<br>Conditions: Volume of 1 L; Number of revolutions of 14000 rpm; Dispersion time for 10 min |
| Coating | Equipment: Screen printing apparatus<br>Target thickness of 5 μm<br>Drying temperature: 100° C. |

(2) Formation of First Insulating Layer i) Preparation of Binder Solution

To a pot having a volume of 1 L, 160 g of PVDF-HFP (polyvinylidene fluoride-propylene hexafluoride copolymer) was added and 640 g of NMP solvent was further added. After that, mixing in the pot was performed with a pot mixer. The mixing was performed at number of revolutions of 150 rpm for 24 hours. As a result, a binder solution containing 20 mass % PVDF-HFP in NMP was obtained.

ii) Preparation of First Insulating Layer Paste

Primary Preparation

To a pot having a volume of 500 mL, 100 g of alumina powder (D50=0.3 μm) was added, subsequently 700 g of media balls (zirconia balls, diameter: 5 mm) were added, and 80 g of NMP was further added as a solvent. Pulverization in the pot was performed with a pot mixer (at number of revolutions of 150 rpm for 16 hours). Thus, the primary preparation was performed.

Secondary preparation To this pot, 222 g of the above-described binder solution was added and mixing was performed with a pot mixer (at number of revolutions of 150 rpm for 4 hours). The resultant solution was taken out through filtration with a mesh. Thus, first insulating layer slurry (first insulating layer paste) was obtained.

The thus-prepared first insulating layer paste was applied to the above-described active-material layer 21b to provide an electrode having the first insulating layer having a thickness of 3 μm in FIG. 3(a) (note that the active-material layer 21b and the first insulating layer 42 were formed only on a single surface of the collector electrode 21a).

The width of the first insulating layer 42 (both in directions X and Y in FIG. 3(a)) was 1 mm.

The air permeability of the first insulating layer 42 was 5320 s/100 cc.

The air permeability was measured with a Digital Oken Type Air-permeability tester ("EG-5-1MR" manufactured by ASAHI SEIKO CO., LTD.) by the method described in the first embodiment.

Two electrodes formed in this manner were arranged such that the first insulating layers 42 thereof face each other and subjected to thermocompression bonding (150° C., 20 MPa, 30 seconds). Thus, a single electric storage unit was produced.

(3) Lamination and Injection

To this laminated body, the positive-electrode tab 23a and the negative-electrode tab 33a formed of aluminum were bonded by welding.

As illustrated in FIG. 1(a) (note that a single electric storage unit was included), both surfaces of the electric storage unit were wrapped with an aluminum laminate film. Sealing portions were preliminary sealed with an impulse sealer to form a cell.

The preliminary sealing was performed by heating to heat-bond together polypropylene films formed on the inner surfaces of the aluminum laminate film.

After three sides of the aluminum laminate film were preliminary sealed, 90 μL of 1-ethyl-3-methylimidazolium tetrafluoroborate serving as an electrolyte was injected into the preliminarily sealed aluminum laminate film constituting a package. Thus, the electrolyte was supplied into the electric storage unit. After that, a sealing portion including a final sealing portion was completely sealed with a vacuum sealer (manufactured by FURUKAWA MFG. CO., LTD.).

Thus, the electric double layer capacitor in Example 1 was produced.

Similarly, electric double layer capacitors in Example 2, Example 3, Comparative example 1, and Comparative example 2 below were produced.

An electric double layer capacitor sample in Example 2 was produced by, in Example 1, forming a porous second insulating layer (thickness: 3 μm) by printing in a region of the active-material layer in which the first insulating layer was not formed (that is, the configuration in plan view corresponds to FIG. 5(a) (note that a single surface alone was used)).

The other sample production conditions were the same as in Example 1.

The second insulating layer (separator layer) was formed in the following manner.

Primary Preparation

To a pot having a volume of 500 mL, 100 g of alumina powder (D50=0.3 μm) was added, subsequently 700 g of media balls (zirconia balls, diameter: 5 mm) were added, and 100 g of NMP was further added as a solvent. Pulverization in the pot was performed with a pot mixer (at number of revolutions of 150 rpm for 16 hours). Thus, the primary preparation was performed.

Secondary Preparation

To this pot, 68 g of the binder solution used in Example 1 was added and mixing was performed with a pot mixer (at number of revolutions of 150 rpm for 4 hours). Thus, about 100 mL of second insulating layer slurry (second insulating layer paste) was obtained.

The thus-prepared second insulating layer paste was applied to form the above-described second insulating layer having a thickness of 3 μm.

The air permeability of the second insulating layer (separator layer) was 220 s/100 cc.

The air permeability was measured with a Digital Oken Type Air-permeability tester ("EG-5-1MR" manufactured by ASAHI SEIKO CO., LTD.) by the method described in the first embodiment.

In the sample of Example 3, the first insulating layer 42 was formed so as to have the configuration in FIG. 2(a) (note that, as in Example 1, a single surface alone was used).

The first insulating layer paste used in Example 1 was applied to the above-described active-material layer 21b as in Example 1 to provide an electrode that had the first insulating layer having a thickness of 3 μm and had the configuration in FIG. 2(a).

The width of the first insulating layer 42 (both in directions X and Y in FIG. 2(a)) was 1 mm. The length of a side of each square region of the active-material layer 21b on which the first insulating layer 42 was not formed was 0.8 mm.

The air permeability of the first insulating layer 42 was 5320 s/100 cc.

The air permeability was measured with a Digital Oken Type Air-permeability tester ("EG-5-1MR" manufactured by ASAHI SEIKO CO., LTD.) by the method described in the first embodiment.

The other sample production conditions were the same as in Example 1.

In the sample of Comparative example 1, a separator layer (thickness: 3 μm) was formed over the entire surface of the active-material layer (10 mm×10 mm sides) in Example 1. The separator layer was formed by the same method as in Example 2.

The other sample production conditions were the same as in Example 1.

In the sample of Comparative example 2, a first insulating layer (thickness: 3 μm) was formed over the entire surface of the active-material layer (10 mm×10 mm sides) in Example 1. The first insulating layer was formed by the same method as in Example 1.

The other sample production conditions were the same as in Example 1.

In the sample of Comparative example 1, due to lack of adhesiveness of the separator layer, the shape of the electric storage unit was not maintained. Thus, an electric double layer capacitor in which the positive electrode and the negative electrode were bonded together was not obtained.

Accordingly, in Examples 1 to 3 and Comparative example 2 that provided electric double layer capacitors in which the positive electrode and the negative electrode were bonded together, each electric double layer capacitor was measured in terms of capacitance (CAP), electric resistance (ESR), and leakage current.

Figure 17:
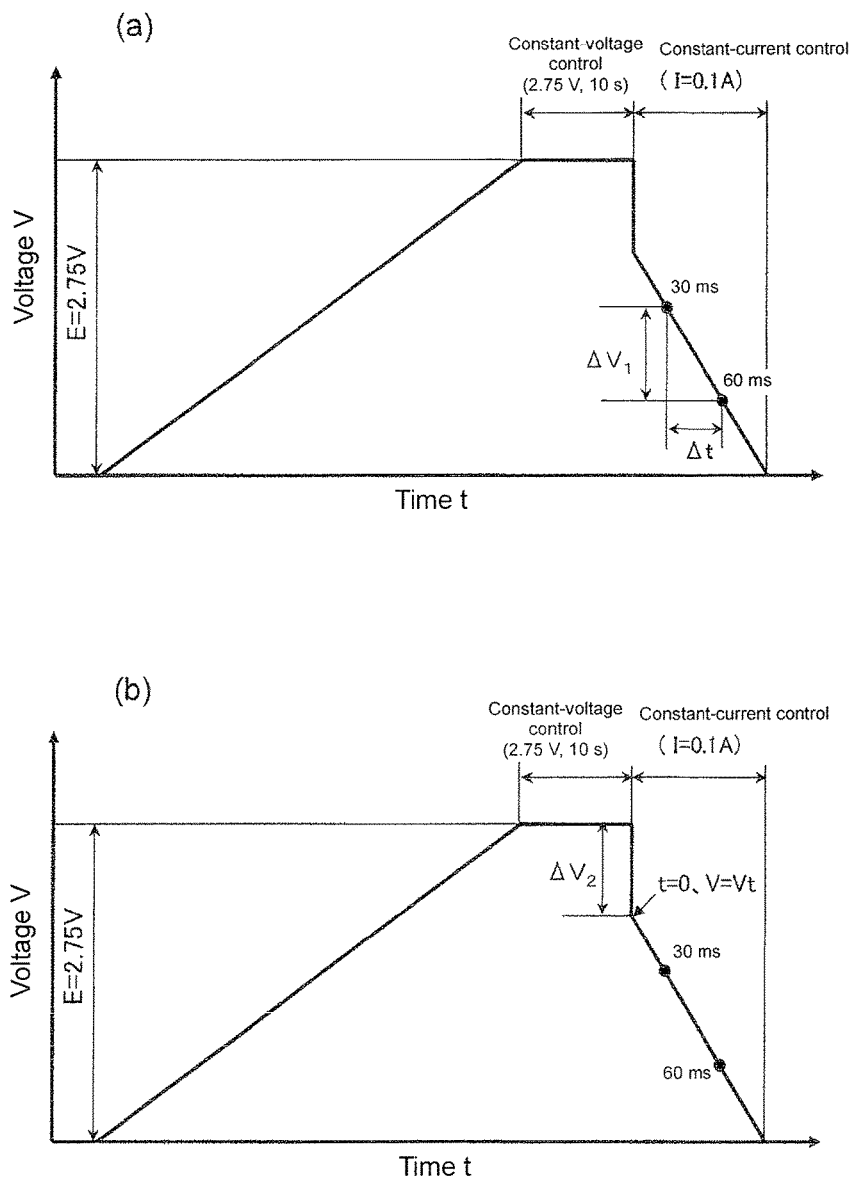
FIG. 17(a) is a schematic view illustrating a measurement method of capacitance (CAP).
FIG. 17(b) is a schematic view illustrating a measurement method of electric resistance (ESR).

FIG. 17(a) is a schematic view illustrating a measurement method of capacitance (CAP). FIG. 17(b) is a schematic view illustrating a measurement method of electric resistance (ESR).

The capacitance (CAP) of the electric double layer capacitor was measured in the following manner.

The electric double layer capacitor was subjected to constant-current charging at a charging current of 100 mA to 2.75 V and subsequently maintained at 2.75 V for 10 seconds. After that, constant-current discharging was performed with I=100 mA. The relationship between voltage (V) and time (t) during this constant-current discharging was measured. The relationship between voltage and time in the range of 30 ms to 60 ms from the initiation of discharging was subjected to linear approximation. The gradient $\Delta V_1/\Delta t$ (negative value) of this approximate line was determined. The capacitance (CAP) was calculated with a formula (2) below.

$$CAP = -I \cdot \Delta t / \Delta V_1 \quad (2)$$

The electric resistance (ESR) of the electric double layer capacitor was measured in the following manner.

The electric double layer capacitor was subjected to constant-current charging at a charging current of 100 mA to 2.75 V and subsequently maintained at 2.75 V for 10 seconds. After that, constant-current discharging was performed with I=100 mA. As illustrated in FIG. 17(b), immediately after initiation of discharging, the voltage is sharply decreased from 2.75 V by $\Delta V_2$ due to electric resistance (ESR).

This $\Delta V_2$ was determined in the following manner.

The relationship between voltage (V) and time (t) during the constant-current discharging was measured. The relationship between voltage and time in the range of 30 ms to 60 ms from the initiation of discharging was subjected to linear approximation. From this approximate line, voltage Vt immediately after the initiation of discharging, that is, at t=0 was determined.

$\Delta V_2$ was calculated with a formula (3) below.

$$\Delta V_2 = 2.75 - Vt \quad (3)$$

After $\Delta V_2$ was thus calculated, ESR was calculated with a formula (4) below.

$$ESR = \Delta V_2 / I \quad (4)$$

The leakage current of the electric double layer capacitor was measured in the following manner.

The electric double layer capacitor was subjected to constant-current charging at a charging current of 100 mA to 2.75 V and subsequently maintained at 2.75 V for 300 seconds. At this time, since the voltage was decreased due to leakage current, charging needed to be continued to maintain the constant voltage. The magnitude of current I passed for maintaining the constant voltage was equal to the leakage current.

Thus, the current I after the constant voltage was maintained for 300 seconds was defined as the leakage current.

The measurement results of capacitance, electric resistance, and leakage current obtained in the above-described manner are described in Table 2.

TABLE 2

| | Capacitance (mF) | Resistance (mΩ) | Leakage current (μA) |
|---|---|---|---|
| Example 1 | 91 | 168 | 51 |
| Example 2 | 97 | 249 | 39 |
| Example 3 | 99 | 234 | 46 |
| Comparative example 2 | Unmeasurable | Unmeasurable | 36 |

Table 2 indicates the following.

In Comparative example 2, under the above-described discharging conditions, the resistance value was excessively high and the voltage was decreased after 30 ms elapsed from the initiation of discharging. Accordingly, the voltage was unmeasurable and hence the capacitance and the resistance value were unmeasurable.

In each of Examples 1 to 3, which allows reduction in the size and profile of the electric storage device, the capacitance was higher than that of Comparative example 2 (the capacitance in Comparative example 2 was so low that it was unmeasurable). In Example 1, the resistance value was low. In Example 2, although the resistance value was higher than that of Example 1, an electric double layer capacitor having a lower leakage current was provided.

In Example 3, although the capacitance was high and the resistance value was higher than that of Example 1, the leakage current was lower than that of Example 1.

As described above, the present invention can provide an electric storage device that has a small size, a low profile, a low resistance, and a high capacitance.

REFERENCE SIGNS LIST 1 electrochemical-device laminate block
11a package lid part
11b package base part
14 second insulating layer (separator layer)
20A positive-electrode composite sheet
21a positive-electrode collector electrode
21b positive-electrode active-material layer
21t positive-electrode terminal electrode 22a, 32a conductive adhesive
22b positive-electrode package electrode
30A negative-electrode composite sheet
31a negative-electrode collector electrode
31b negative-electrode active-material layer
31t negative-electrode terminal electrode
32b negative-electrode package electrode
42 first insulating layer
50A positive electrode-negative electrode integrated sheet
60 electric storage unit
80, 80A electric double layer capacitor
100 base film
101 release layer
102 positive-electrode collector film
R102 resist pattern
LB1 electrochemical-device laminate sheet
D1 cutting line

The invention claimed is:

1. An electric storage device comprising:
a positive electrode including a positive-electrode collector electrode and a positive-electrode active-material layer disposed on the positive-electrode collector electrode;
a negative electrode including a negative-electrode collector electrode and a negative-electrode active-material layer disposed on the negative-electrode collector electrode such that the negative-electrode active-material layer faces the positive-electrode active-material layer,
a first insulating layer bonded to both the positive-electrode active-material layer of the positive electrode and to the negative-electrode active-material layer of the negative electrode to insulate the positive electrode from the negative electrode; and
at least one closed region defined by the first insulating layer and disposed between the positive-electrode active-material layer of the positive electrode and the negative-electrode active-material layer of the negative electrode, the at least one closed region being surrounded by the first insulating layer in a plan view of the electric storage device,
wherein the at least one closed region holds an electrolyte between the positive electrode and the negative electrode,
wherein the first insulating layer has an air permeability P that satisfies:

$$1250\ s/100\ cc < P < 95000\ s/100\ cc,$$

wherein s=seconds and cc=cubic centimeters.

2. The electric storage device according to claim 1, wherein the first insulating layer comprises a particulate insulator.

3. The electric storage device according to claim 1, further comprising a second insulating layer disposed in the at least one closed region.

4. The electric storage device according to claim 3, wherein the second insulating layers is porous and has a lower air permeability than the air permeability P of the first insulating layer.

5. The electric storage device according to claim 1, wherein the first insulating layer comprises four side portions disposed between the positive electrode and the negative electrode to define the at least one closed region.

6. The electric storage device according to claim 5, wherein the first insulating layer comprises a square-frame shape.

7. The electric storage device according to claim 1, wherein the first insulating layer disposed between the positive electrode and the negative electrode defines a plurality of closed regions.

8. The electric storage device according to claim 7, wherein the plurality of closed regions hold the electrolyte.

9. The electric storage device according to claim 1, wherein the first insulating layer is bonded to side surfaces of each of the positive-electrode collector electrode, the positive-electrode active-material layer, the negative-electrode collector electrode and the negative-electrode active-material layer.

10. The electric storage device according to claim 1, wherein the first insulating layer is bonded to side surfaces of each of the positive-electrode active-material layer and the negative-electrode active-material layer and to main surfaces of each of the positive-electrode collector electrode and the negative-electrode collector electrode.

11. The electric storage device according to claim 1, wherein the first insulating layer is bonded to main surfaces of each of the positive-electrode active-material layer and the negative-electrode active-material layer.

12. A method for producing an electrode composite sheet, the method comprising:
forming a plurality of electric storage units, each unit including:
a positive electrode including a positive-electrode collector electrode and a positive-electrode active-material layer disposed on the positive-electrode collector electrode,
a negative electrode including a negative-electrode collector electrode and a negative-electrode active-material layer disposed on the negative-electrode collector electrode, such that the negative-electrode active-material layer faces the positive-electrode active-material layer,
a first insulating layer bonded to both the positive-electrode active-material layer of the positive electrode and to the negative-electrode active-material layer of the negative electrode to insulate the positive electrode from the negative electrode, the first insulating layer formed from a resin permeable to an electrolyte such that an air permeability P satisfies:

$$1250\ s/100\ cc < P < 95000\ s/100\ cc,$$

wherein s=seconds and cc=cubic centimeters, and
at least one closed region defined by the first insulating layer and disposed between the positive-electrode active-material layer of the positive electrode and the negative-electrode active-material layer of the negative electrode, the at least one closed region being surrounded by the first insulating layer in a plan view of the electric storage device,
wherein the at least one closed region holds the electrolyte between the positive electrode and the negative electrode; and
producing the electrode composite sheet by integrating a plurality of the positive-electrode collector electrodes or a plurality of the negative-electrode collector electrodes using the first insulating layer.

13. The method for producing the electrode composite sheet according to claim 12, further comprising:
producing a positive electrode-negative electrode integrated sheet by arranging and integrating the plurality of the electric storage units in at least one direction; and
subsequently dividing the electric storage units arranged in the at least one direction.

14. The method for producing the electrode composite sheet according to claim 12, further comprising supplying the electrolyte into the plurality of electric storage units by permeation of the electrolyte through the first insulating layer after the plurality of electric storage units are formed.

15. A method for producing an electric storage device, the method comprising:
    forming a positive electrode including a positive-electrode collector electrode and a positive-electrode active-material layer disposed on the positive-electrode collector electrode;
    forming a negative electrode including a negative-electrode collector electrode and a negative-electrode active-material layer disposed on the negative-electrode collector electrode, such that the negative-electrode active-material layer faces the positive-electrode active-material layer; and
    forming a first insulating layer bonded to both the positive-electrode active-material layer of the positive electrode and to the negative-electrode active-material layer of the negative electrode to insulate the positive electrode from the negative electrode, the first insulating layer formed from a resin permeable to an electrolyte such that an air permeability P satisfies:

$1250\ s/100\ cc < P < 95000\ s/100\ cc$, wherein s=seconds and cc=cubic centimeters,
    wherein the first insulating layer defines at least one closed region between the positive-electrode active-material layer of the positive electrode and the negative-electrode active-material layer of the negative electrode, the at least one closed region being surrounded by the first insulating layer in a plan view of the electric storage device and holding the electrolyte between the positive electrode and the negative electrode.

16. The method for producing the electric storage device according to claim 15, further comprising supplying, after formation of the electric storage device, the electrolyte into the electric storage device by permeation of the electrolyte through the first insulating layer.

17. The method for producing the electrode composite sheet according to claim 15, further comprising forming a second insulating layer in the at least one closed region.

18. The method for producing the electric storage device according to claim 15, wherein the second insulating layer is porous and has a lower air permeability than the air permeability P of the first insulating layer.

19. The method for producing the electric storage device according to claim 15, wherein the step of forming the first insulating layer comprises forming the first insulating layer having a square-frame shape.

* * * * *